United States Patent [19]

Baker et al.

[11] Patent Number: 5,715,437
[45] Date of Patent: Feb. 3, 1998

[54] SYSTEM FOR, AND METHOD OF, PROCESSING IN HARDWARE COMMANDS RECEIVED FROM SOFTWARE WITHOUT POLLING OF THE HARDWARE BY THE SOFTWARE

[75] Inventors: David C. Baker; Michael D. Asal, both of Austin, Tex.

[73] Assignee: Brooktree Corporation, San Diego, Calif.

[21] Appl. No.: 337,939

[22] Filed: Nov. 10, 1994

[51] Int. Cl.[6] .................. G06T 1/60; G06F 15/76
[52] U.S. Cl. .................. 395/507; 395/501; 395/509; 395/512; 395/519; 395/526; 395/376; 345/202; 345/203
[58] Field of Search .................. 395/501–526, 395/376, 391, 392, 394, 570, 687; 345/202, 203

[56] References Cited

U.S. PATENT DOCUMENTS

| | | | |
|---|---|---|---|
| 4,606,068 | 8/1986 | Habitzreiter et al. | 382/246 |
| 4,755,937 | 7/1988 | Glier | 395/476 |
| 5,129,036 | 7/1992 | Dean et al. | 395/2.09 |
| 5,192,999 | 3/1993 | Graczyk et al. | 348/552 |
| 5,262,861 | 11/1993 | Hertz | 348/521 |
| 5,272,520 | 12/1993 | Kanoh et al. | 348/453 |
| 5,274,779 | 12/1993 | Stewart et al. | 395/250 |
| 5,276,798 | 1/1994 | Peaslee et al. | 395/505 |
| 5,283,819 | 2/1994 | Glick et al. | 379/90 |
| 5,297,231 | 3/1994 | Miller | 395/2.1 |
| 5,299,309 | 3/1994 | Kuo et al. | 395/512 |
| 5,321,806 | 6/1994 | Meinerth et al. | 395/522 |
| 5,327,156 | 7/1994 | Masukane et al. | 345/113 |
| 5,333,135 | 7/1994 | Wendorf | 370/394 |
| 5,333,299 | 7/1994 | Koval et al. | 395/551 |
| 5,367,301 | 11/1994 | Stiltner et al. | 395/1 |
| 5,369,729 | 11/1994 | Norris | 395/2.67 |
| 5,377,018 | 12/1994 | Rafferty | 358/433 |
| 5,583,822 | 12/1996 | Rao | 345/188 |

OTHER PUBLICATIONS

Developer Kit for Sound Blaster, Hardware Programming Reference, 2nd Edition, Oct. 1993, Creative Labs, pp. 3–1 to 3–29.

K. Jack, Video Demystified A Handbook for the Ditigal Engineer, 1993, pp. 106–109.

Primary Examiner—Mark R. Powell
Attorney, Agent, or Firm—William C. Cray; Susie H. Oh

[57] ABSTRACT

A CPU introduces software commands to a first limited capacity memory (e.g. FIFO), on an integrated circuit chip. Data (e.g. graphics) from a first portion of a second memory (off chip) is processed in accordance with such commands. A second portion (e.g. FIFO) of the second memory may also store commands normally passing from the CPU through the first memory. When the first memory becomes full, the commands may pass from the CPU through the second portion of the second memory (which may have a storage capacity considerably greater than that of the first memory) and then through the first memory. The commands may continue to flow in this auxiliary path until the second portion of the second memory becomes empty. A third memory of a limited capacity on the chip may pass the commands from the CPU to the first memory in the normal operation or to the second portion of the second memory when the first memory becomes full. The CPU may also pass commands to other peripheral equipment while a ready line is high. When low, the ready line prevents commands from passing to the peripheral equipment while the third memory is full. However, a command may pass from the third memory to the first or second memory to make the ready line high. A counter indicates the number of commands in the first and third memories and the second portion of the second memory. Software occasionally interrogates the counter to update in the software the number of commands in the counter.

104 Claims, 14 Drawing Sheets

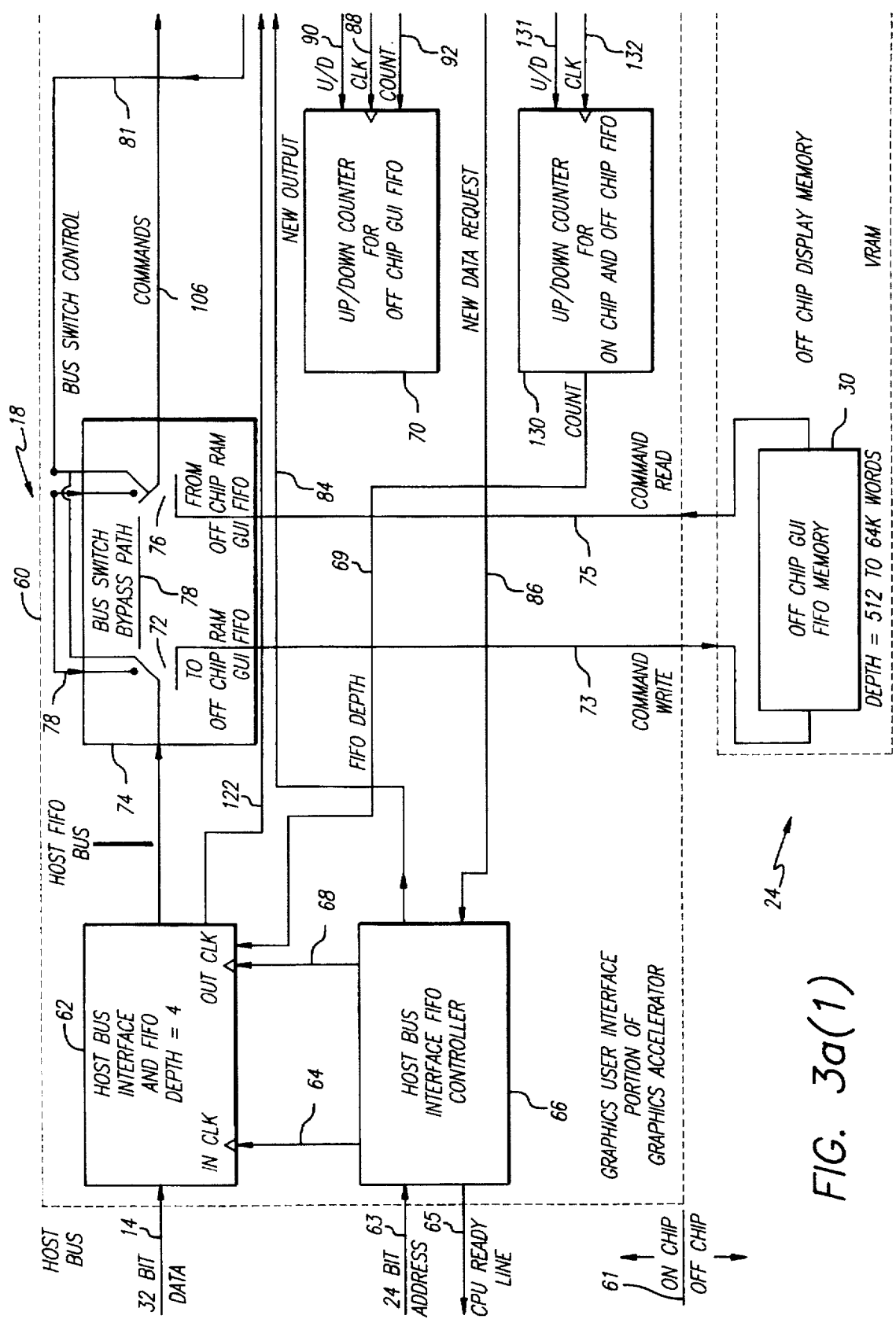
FIG. 3a(1)

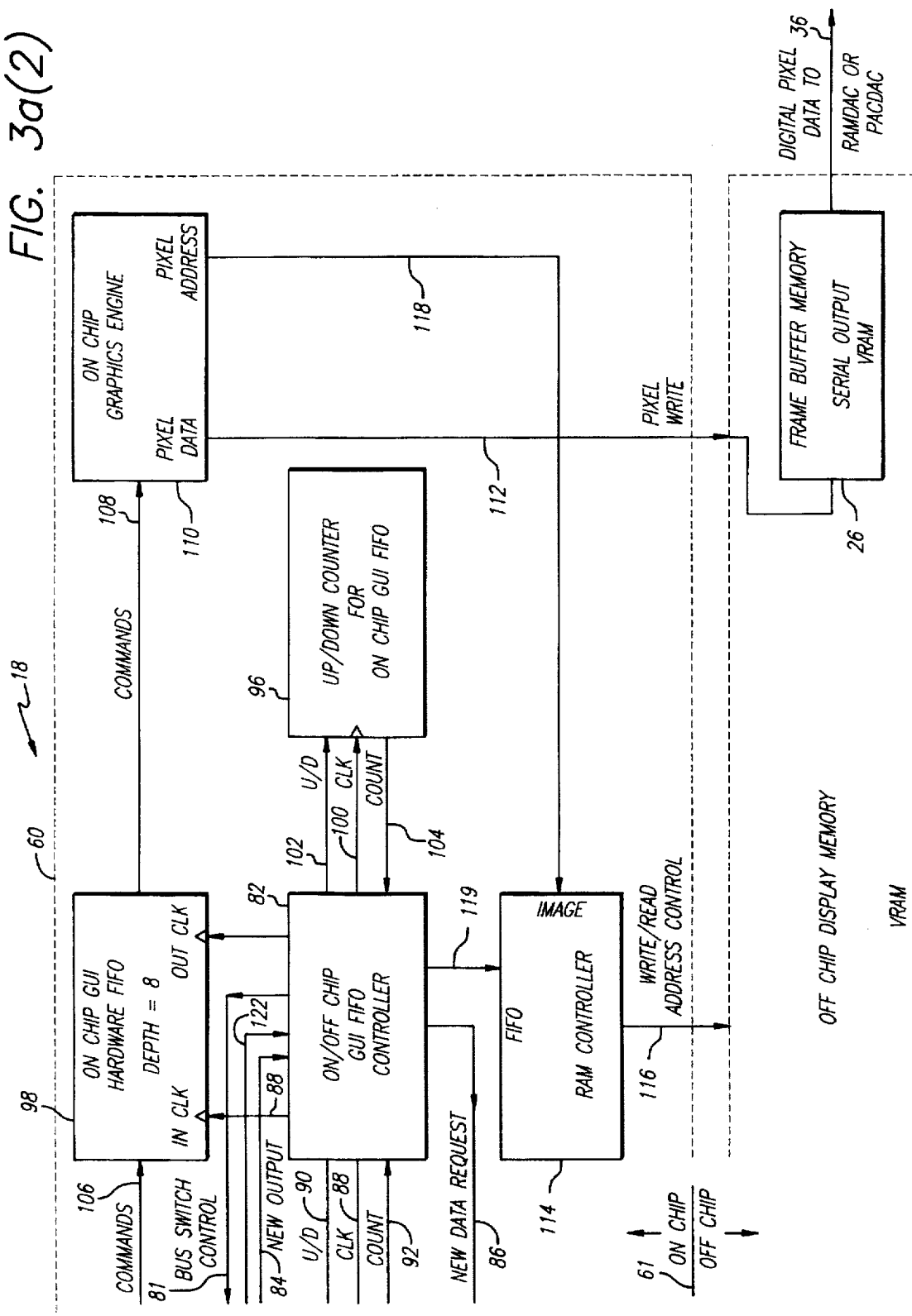

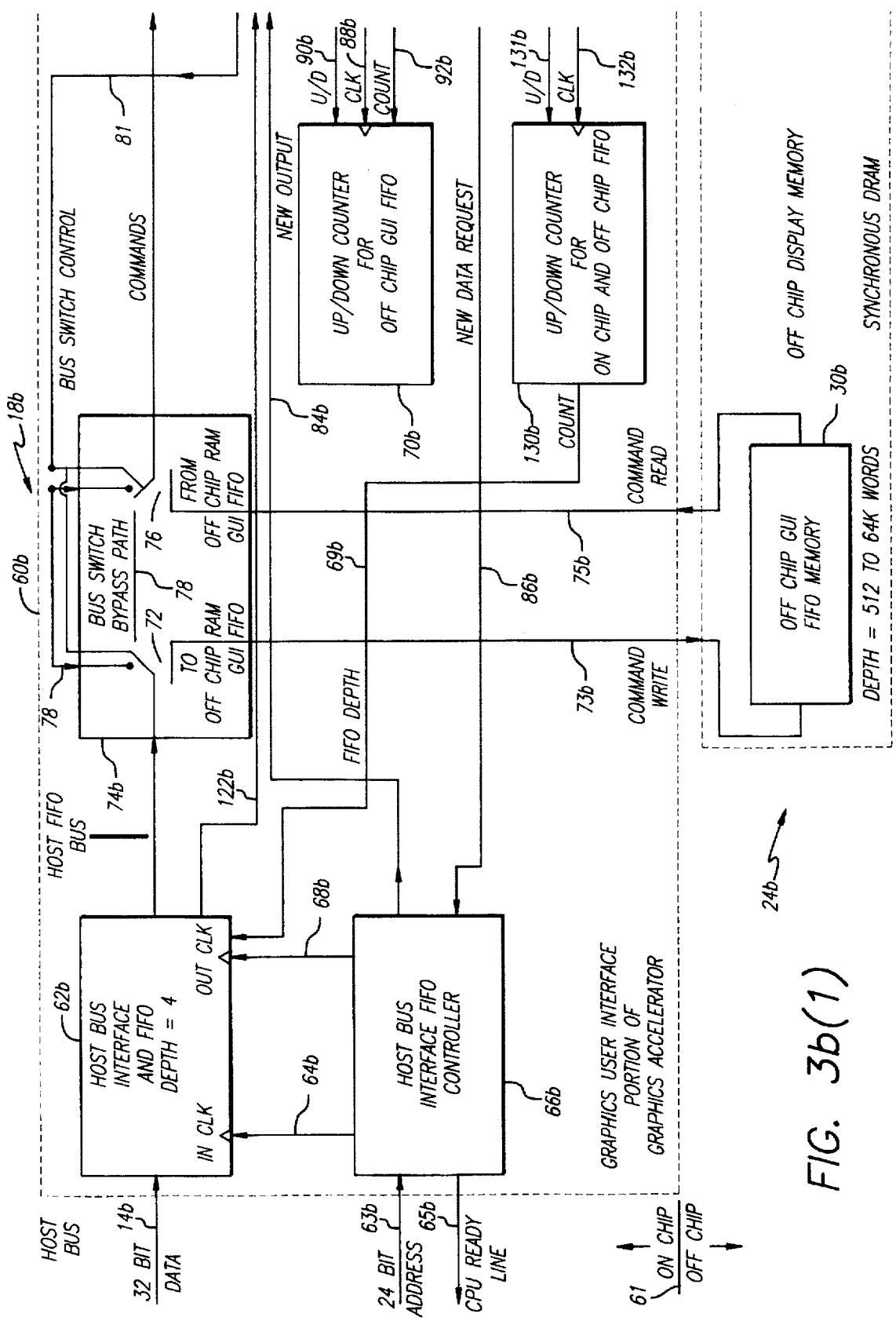
FIG. 3b(1)

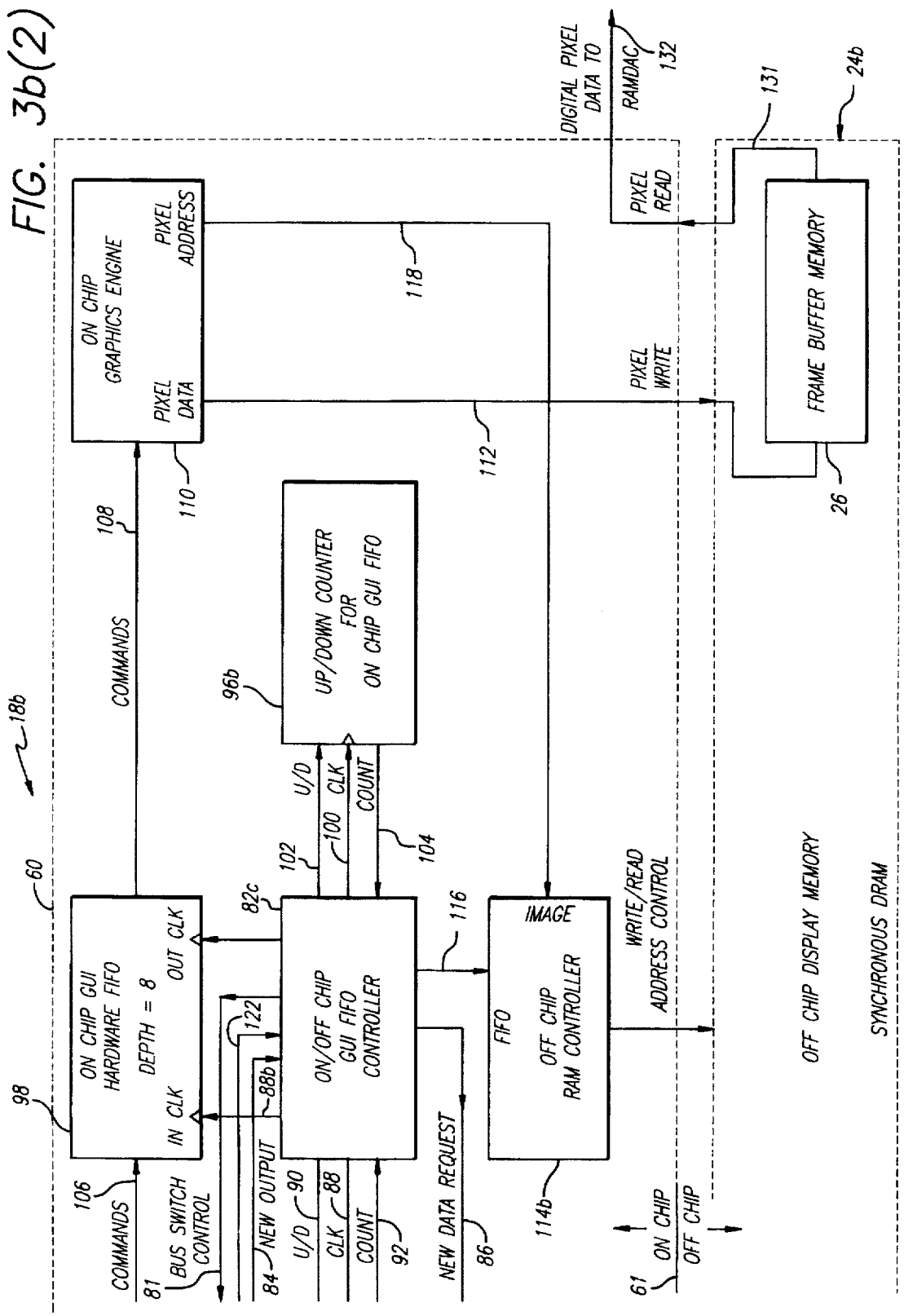
FIG. 3b(2)

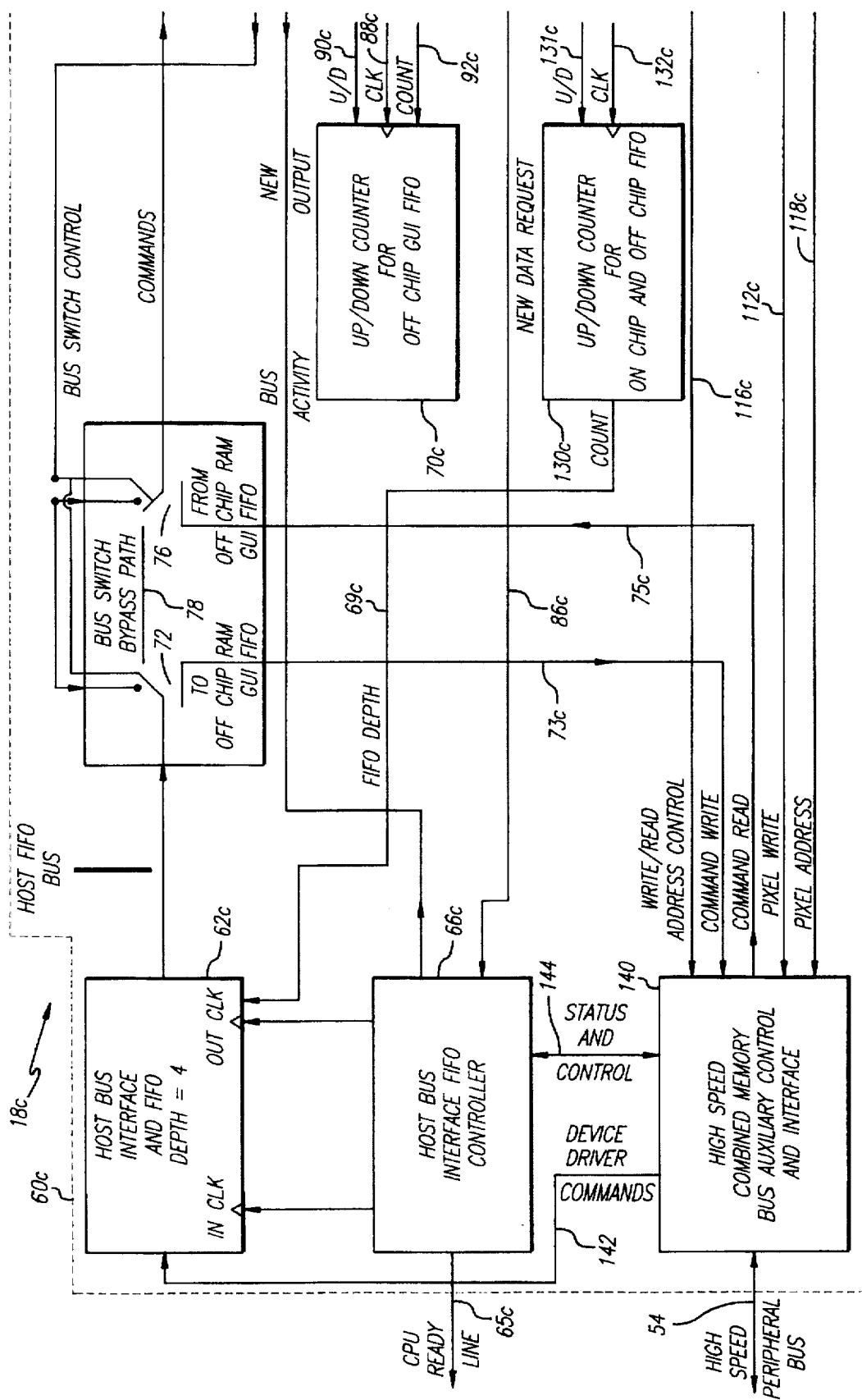
FIG. 3c(1)

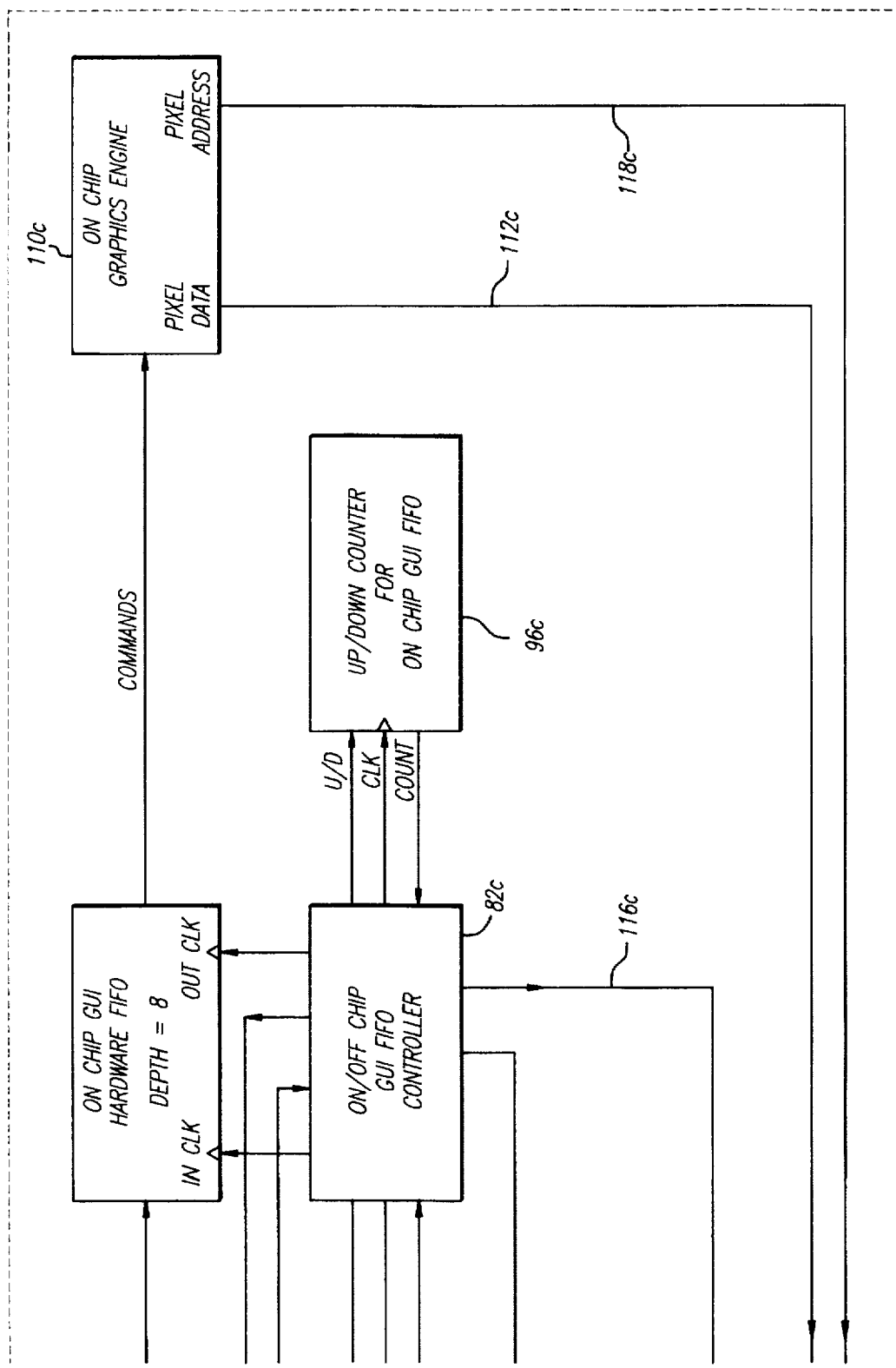
FIG. 3c(2)

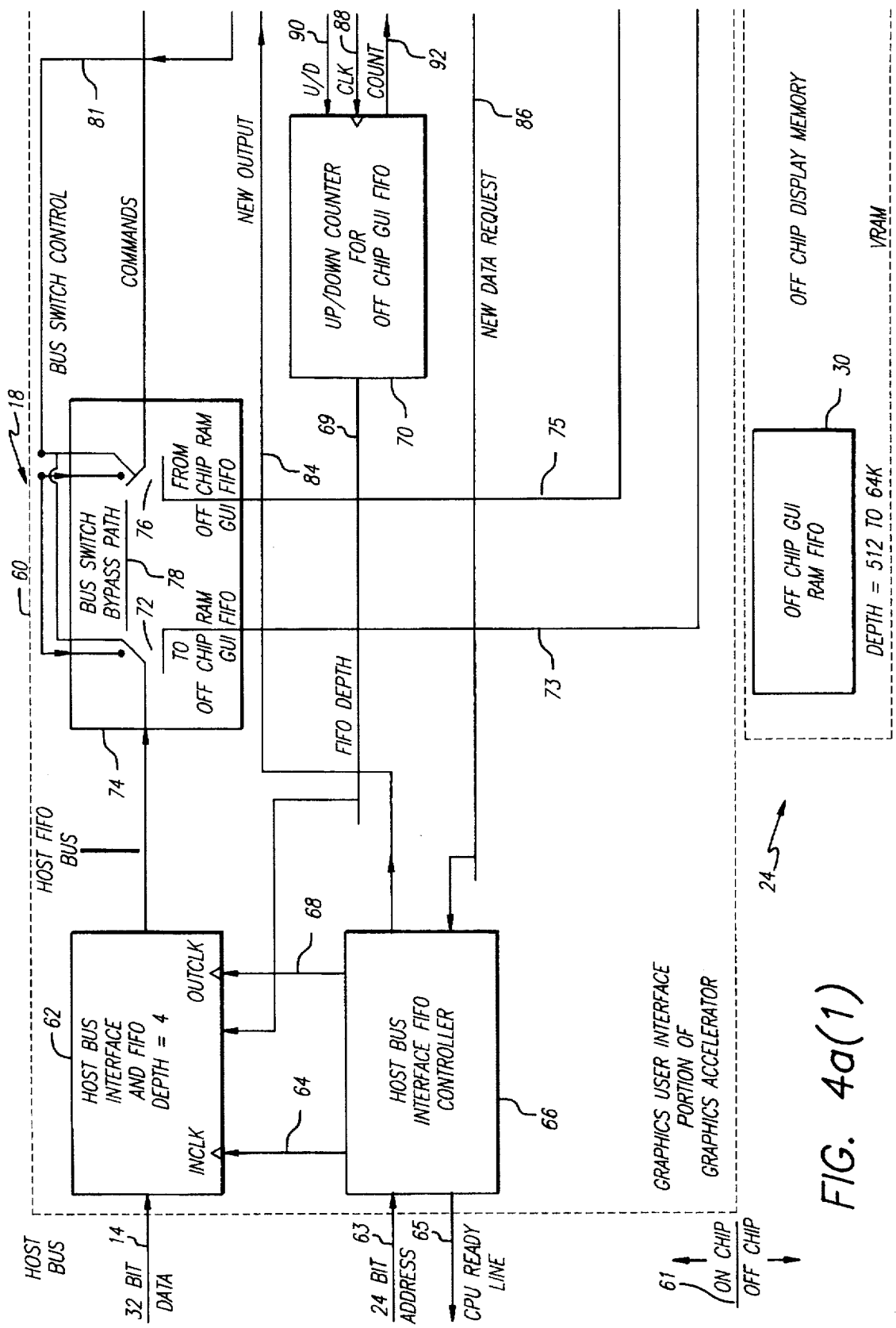
FIG. 4a(1)

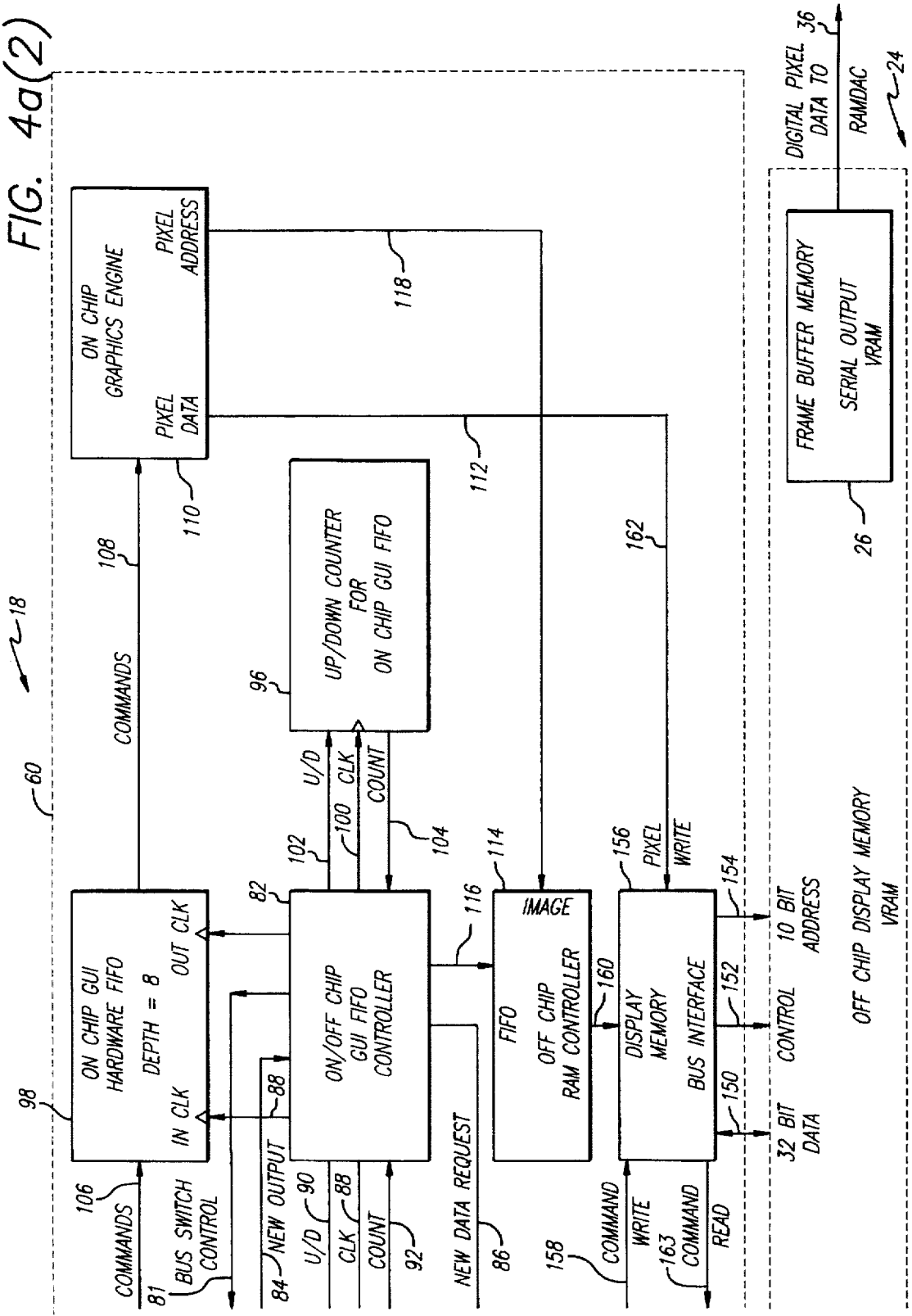
FIG. 4a(2)

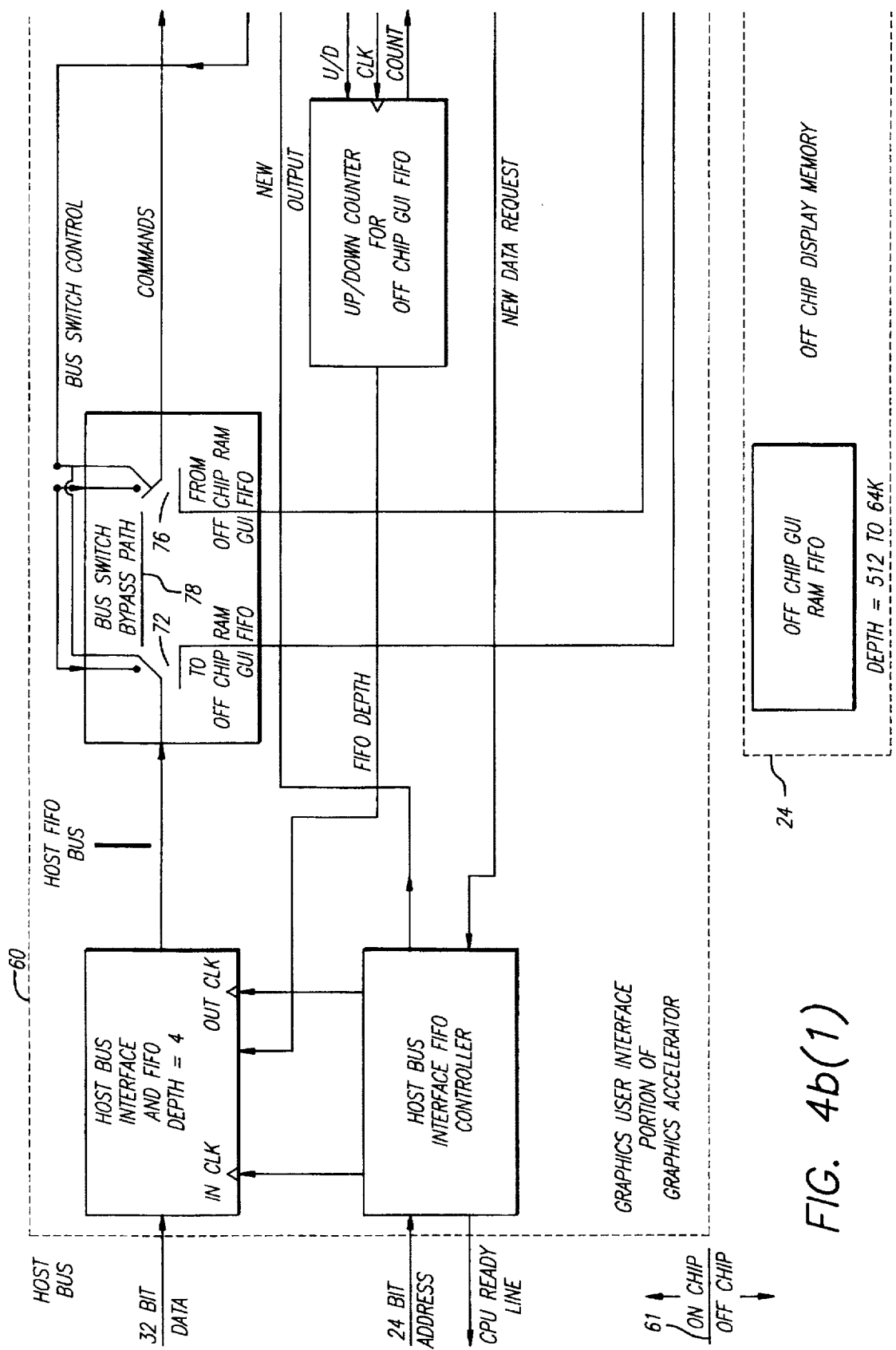
FIG. 4b(1)

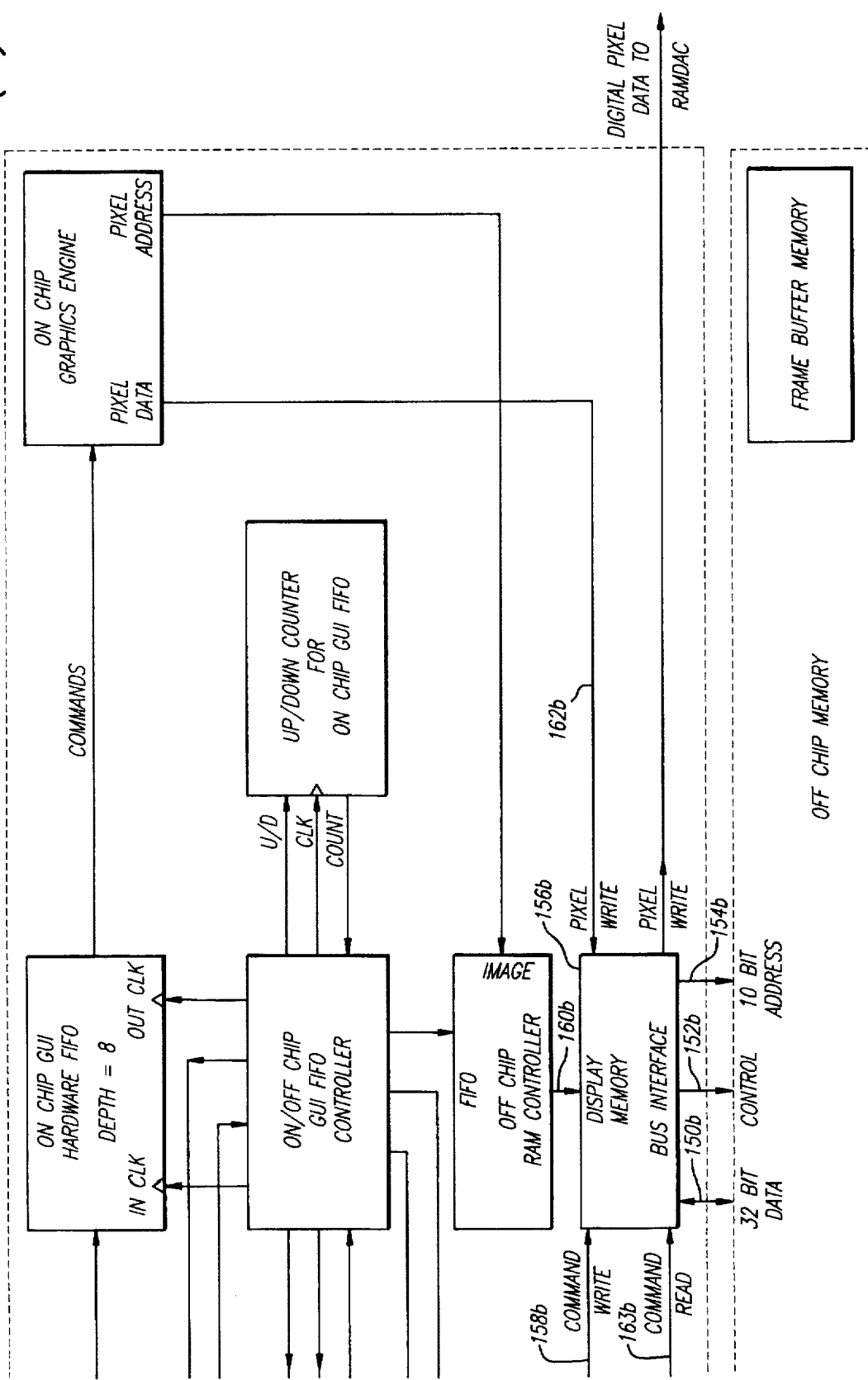

SYSTEM FOR, AND METHOD OF, PROCESSING IN HARDWARE COMMANDS RECEIVED FROM SOFTWARE WITHOUT POLLING OF THE HARDWARE BY THE SOFTWARE

This invention relates to systems for, and methods of processing data in accordance with commands from a central processing unit. More particularly, the invention relates to systems for, and methods of, minimizing the delays provided by software in processing commands, thereby increasing the rate at which data is processed in accordance with such commands.

Architectures presently used for processing graphics information in environments incorporating personal computers typically consist of three (3) layers of software, the last of which communicates with the image rasterization hardware. The three (3) layers of software may be respectively designated as (1) application software, (2) graphics device interface (GDI) software and (3) device driver (DD) software. These three (3) layers of software are schematically illustrated in FIG. 1 of the drawings.

BACKGROUND OF THE INVENTION

The application software is written to accomplish a specific task. An output of the application software may be an image. For example, the application software may provide three (3) vertices to define a triangle. The CPU may process several different applications at the same time. For example, one application may output the vertices of a triangle while another outputs the vertices of a rectangle, both of which are to be displayed simultaneously in different display "windows" of a video monitor. These different display windows may be separated or overlapping on the screen.

The applications software is written to provide the standard inputs to the graphics device interface software for such operations as the drawing and color filling of polygons. This is designated as "polygon fill". The graphics device interface (GDI) software illustratively manages any overlap between the images simultaneously developed in different windows by different software applications such as the triangle and rectangle specified above. For example, the graphics device interface software may clip a part of the triangle or the rectangle when such portions are overlapped by another window. The GDI software passes the clipped polygons to the next level of software, the device driver.

The device driver software (the third software layer) performs several operations on the clipped polygons. For example, in the example in the previous paragraph, the device driver software performs operations on the clipped portions of the triangle and the rectangle. These operations include the steps of breaking each clipped polygon into separate simplified blocks or image lines. These blocks or image lines are to be written into a random access memory (RAM) which stores the image for display on the video monitor. For example, the device driver software indicates the beginning and end of each horizontal line in each polygon and also indicates the color of the line. The device driver software accordingly provides three (3) words (the beginning position of the line, the end position of the line and the individual color between such beginning and end) to define such line.

It may be that the polygon to be rasterized is a vertical line with a width of a few pixels. The device driver software takes account of this by drawing several horizontal lines, each a few pixels long. In another example, a line of an individual color may be slanted at an angle, not 90°, relative to the horizontal lines in the raster scan. This may require each horizontal line drawn to be more than a few pixels, the specific number of pixels depending upon the angle relative to the horizontal.

As will be seen from the discussion above, the device driver software may be relatively complicated. Furthermore, the three (3) layers of software are closely linked in the passage of commands from each layer to the next. For example, the application software has to wait for the graphics device interface to complete the execution of its clipped polygon commands; and the graphics device interface software has to wait for the device driver software to complete the execution of its line fill commands. When the device driver software has completed its commands, it returns control to the applications software for the applications software to provide the commands for the next polygon.

Unfortunately, the communication between the device driver software and the image rasterization hardware is not as efficient as the communication between the three (3) layers of software. The inefficiency results in part because of the way in which the device driver software communicates with the hardware to determine if the hardware has completed the execution of the last command specified by the device driver software. This communication process is designated as "polling". An average of ten (10) to fifteen CPU clock cycles is required after the completion of the execution of the last command from the device driver software for the CPU to recognize that the operation is complete. If the CPU has a clock frequency of thirty three megahertz (33 Mhz), this time may constitute approximately four hundred and fifty nanoseconds (450 ns). During this time, no other graphics software commands may be executed.

Another problem exists between the software and the hardware in the systems now in use. A line exists between the CPU memory and the hardware on the local bus to discontinue the transfer of data from the CPU to the bus. This line is designated as the "CPU ready line". When the voltage on the CPU ready line is forced low, the CPU is not able to transfer commands to any devices on the bus. It is not permissible in the systems now in use for any device on the bus to lower the voltage on the CPU ready line for more than a specified period of time such as a few microseconds. One reason is that the CPU would be unable to properly service hard disk data transfer requests if the CPU ready line is low for more than this period of time. Since the execution of a single device driver graphics command by the hardware may require a time period greater than a few microseconds, the CPU ready line is not suitable for providing a fast arbitration of the flow of graphics commands between the CPU memory and the hardware.

Although the communication time between the software and the hardware is relatively slow, the command execution within the image rasterization hardware is relatively fast. For example, when the hardware communicates with the random access display memory, the recording of a line of ten (10) pixels in the random access memory requires one (1) random DRAM cycle to set the address for the first pixel and then a single additional page mode cycle to record each additional pixel. The random clock cycle may require two clock cycles for address initialization and one clock cycle for pixel data write. If the clock in the hardware has a frequency of twenty five megahertz (25 Mhz), each clock cycle may require forty (40) nanoseconds (40 ns.). Thus, the total transfer time for recording ten (10) pixels in a horizontal line into a random access memory is approximately 80+10(40)=480 nanoseconds.

Line fill for a vertical line requires considerably more time than that specified in the previous paragraph. In such a case, a random cycle write time of one hundred and twenty nanoseconds (120 ns.) is required for each pixel. Thus the total time for recording the ten (10) pixels in the vertical line would be approximately twelve hundred nanoseconds (80+ 40)(10)=(1200 ns.). Thus, the average time for recording the ten (10) pixels, whether horizontal or vertical, is approximately slightly more than eight hundred nanoseconds.

By comparing the average time of approximately eight hundred nanoseconds (800 ns.) in the hardware for recording a horizontal or vertical line of ten (10) pixels and a polling time of approximately four hundred and fifty nanoseconds (450 ns.), it will be seen that the polling time represents significantly more than half of the total time required to record the ten (10) pixels in the average line. This further slows the operation of the system.

The computer graphics industry spends millions of dollars annually in improving the speed at which graphics information is processed in hardware. The speed of processing the graphics information in hardware has accordingly been accelerated considerably. The computer industry would also like to shorten the time for processing the graphics information in software. This may be seen from the discussion above. The computer industry would particularly like to shorten, if not completely eliminate, the time for the polling of the hardware by the software. This problem has been known to exist for a considerable number of years but no one has been able to provide a satisfactory resolution of the problem.

BRIEF DESCRIPTION OF THE INVENTION

This invention provides a system for satisfactorily eliminating the requirement for the polling of the hardware by the software after each command to determine if the hardware has completed that command. The invention provides on an integrated circuit chip a system which enables a large number of commands to be transmitted in succession (a packet of commands) before any polling of the hardware may be required. The system includes memories on the chip of a limited capacity for processing the commands and for providing for the processing of data (e.g. graphics) for output to a display memory in accordance with such commands.

An auxiliary memory portion is provided in the display memory in the system of this invention for receiving overflows of commands not capable of being stored in the memory on the chip. By providing this arrangement, the commands continue to pass in a steady stream, preferably in packet form, from the device driver software to the hardware without polling from the software after each such command.

In one embodiment of the invention, a central processing unit (CPU) introduces software commands to a first memory (e.g. FIFO), of a limited capacity, on an integrated circuit chip. Data (e.g. graphics) from a first portion of a second memory (off chip) is processed in accordance with such commands. A second portion (e.g. FIFO) of the second memory may also store commands normally passing from the CPU through the first memory.

When the first memory becomes full, the commands may pass from the CPU through the second portion of the second memory (which may have a storage capacity considerably greater than that of the first memory) and then through the first memory. The commands may continue to flow in this auxiliary path until the second portion of the second memory becomes empty. A third memory of a limited capacity on the chip may pass the commands from the CPU to the first memory in a normal operation or to the second portion of the second memory when the first memory becomes full.

The CPU may also pass commands to other peripheral equipment while a ready line is high. When low, the ready line prevents commands from passing to the peripheral equipment while the third memory is full. However, a command may pass from the third memory to the first or second memory to make the ready line high.

A counter indicates the number of commands in the first and third memories and the second portion of the second memory. Software occasionally interrogates the counter to update in the software the number of commands in the counter.

BRIEF DESCRIPTION OF THE DRAWINGS

In the drawings:

FIGS. 3a(1) and 3a(2) are somewhat detailed schematic system diagrams, partially in block form, of a portion, including the graphics user interface and the display memory, of the system shown in FIG. 2a when the display memory is a video random access memory (VRAM);

FIGS. 3b(1) and 3b(2) are somewhat detailed schematic system diagrams, partially in block form, of a portion, including the graphics user interface and the display memory, of the system shown in FIG. 2a when the display memory is a synchronous dynamic random access memory (dRAM);

FIGS. 3c(1) and 3c(2) are somewhat detailed schematic system diagrams, partially in block form, of a portion, including the graphics user interface and the display memory, of the system shown in FIG. 2c when the display memory is a high speed random shared main memory;

FIGS. 4a(1) and 4a(2) are somewhat detailed system diagrams similar to that shown in FIG. 3a(1) and 3a(2) but show, on more of an actual basis than that shown in FIGS. 3a(1) and 3a(2), the passage of commands, addresses and data between the graphics user interface and the display memory; and FIGS. 4b(1) and 4b(2) are somewhat detailed system diagrams similar to that shown in FIGS. 3b(1) and 3b(2) but show, on more of an actual basis than that shown in FIGS.

3b(1) and 3b(2), the passage of commands, addresses and data between the graphics user interface and the display memory.

DETAILED DESCRIPTION OF THE INVENTION

Figure 1:
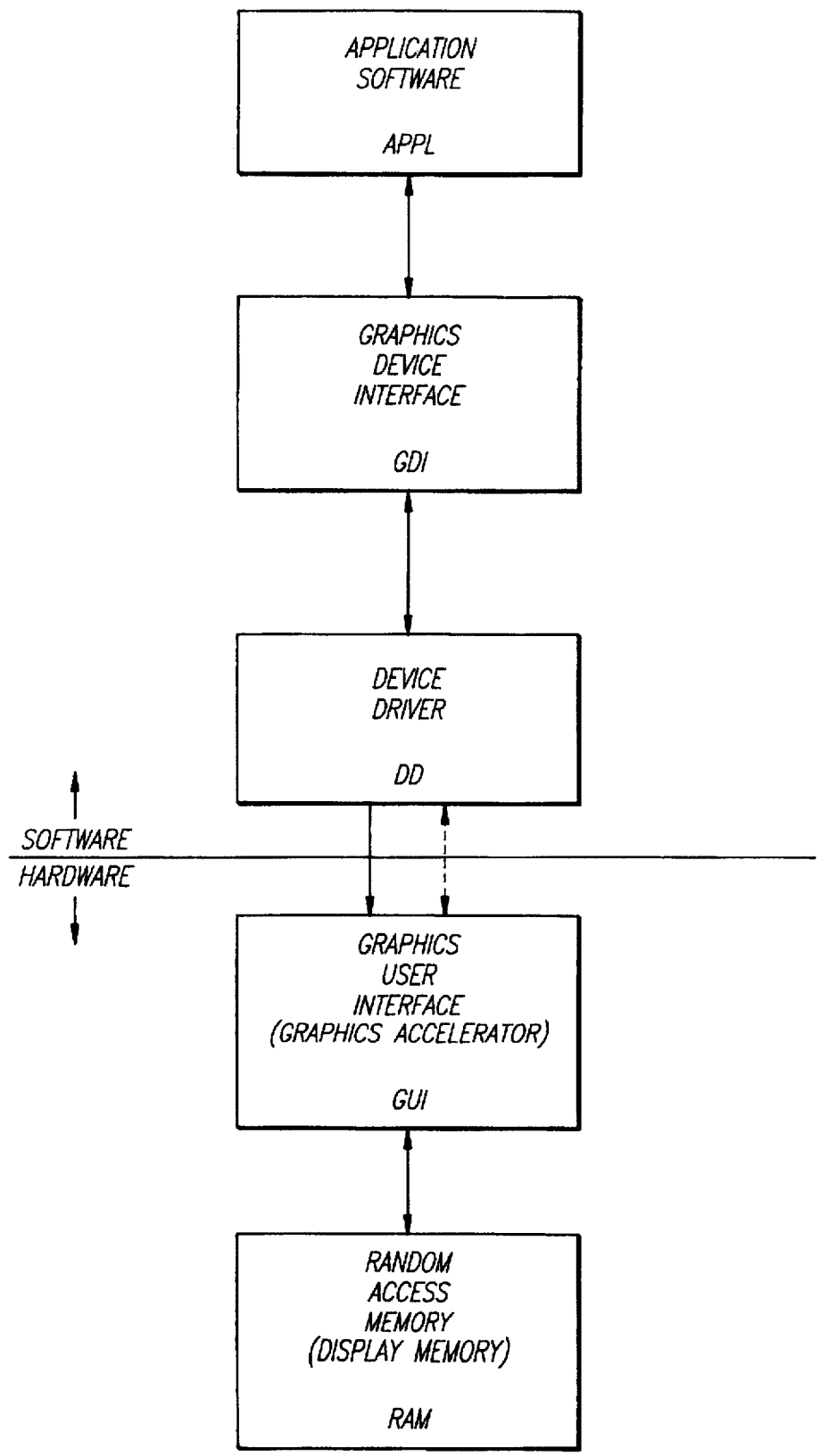
FIG. 1 illustrates a general arrangement of software and hardware in a system of this invention.

FIG. 1 is a simplified block diagram of three (3) layers of application software and the graphics hardware associated with the software. The three (3) layers of software are designated in individual blocks as (1) application ("Appl") software, (2) graphics device interface ("GDI") software and (3) device driver ("DD") software. The graphics hardware is respectively designated in individual blocks as (1) graphics user interface ("GUI") or graphics accelerator and (2) random access memory (RAM) or display memory. The distinction between the software and the hardware is designated in FIG. 1 by a horizontal line and by the word "SOFTWARE" and a line with an upwardly pointing arrow above the horizontal line and by the word "HARDWARE" and a line in the downwardly pointing arrow below the horizontal line.

When the images are to be displayed on a video monitor, the application software provides vertices defining the outlines of images. For example, when a triangle is to be displayed on the video monitor, the application software provides the three (3) vertices defining the boundaries of the triangle. Similarly, the application software defines a parallelogram by four (4) vertices.

Sometimes, more than one (1) image window can be provided simultaneously by a single software application. In other cases, more than one software application may be provided in the CPU on a time-shared basis. Each application may be outputting graphics data in a separate "window" on the video display. For example, each of the triangle and the parallelogram may be provided in a separate window by the application software. Application software such as described above is well known in the art.

The graphics device interface in FIG. 1 acts upon the polygon vertices provided by the application software. The graphics device interface clips the polygons in accordance with the window superposition to be provided for the images. If the polygon is clipped by a superimposed window, the graphics device interface cuts off the portion of the polygon overlapped by that window. Graphics device interface software such as described above is well known in the prior art.

The device driver software in FIG. 1 acts upon the clipped polygons provided by the graphics device interface software. The device driver software breaks the clipped polygons into lines or rectangles and then transmits the resulting line fill commands or rectangle fill commands to the graphics user interface (GUI) hardware. Device driver software such as described in this paragraph are well known in the prior art.

FIG. 1 also shows hardware identified in block form as a graphics user interface (GUI) and also identified as a graphics accelerator. GUI hardware is generally known in the prior art but the GUI hardware individual to the system of this invention is not known in the prior art. The GUI hardware shown in FIG. 1 processes the commands from the device driver software in a manner unique to the system of this invention.

The hardware shown in FIG. 1 also includes a random access memory (RAM) or display memory. Random access memories or display memories are well known in the art. The random access memory or display memory in the system of this invention may be considered to be constructed in a manner similar to the random access memory or display memory of the prior art but the use provided by a portion of this memory is unique to the system of this invention. In that sense, the random access memory or display memory of this invention is different from the random access memories or display memories of the prior art.

The system of this invention is advantageous in that the device driver software provides commands to the GUI hardware and does not have to poll the GUI hardware after each command to determine whether or when the GUI hardware has completed the processing of such command. This is indicated by a line between the device driver software and the GUI hardware with an arrow pointing toward the GUI hardware. However, after the transmission of a packet of commands, the device driver software may poll the GUI hardware to determine the space available in the graphics command storage portion of the display memory. Since this polling is infrequent, this is indicated by a broken line between the device driver software and the GUI hardware with an arrow pointing toward the device driver software. A line with arrows extending in opposite directions is disposed between the GUI hardware and the display memory to indicate that the GUI hardware and the display memory communicate with each other.

Figure 2A:
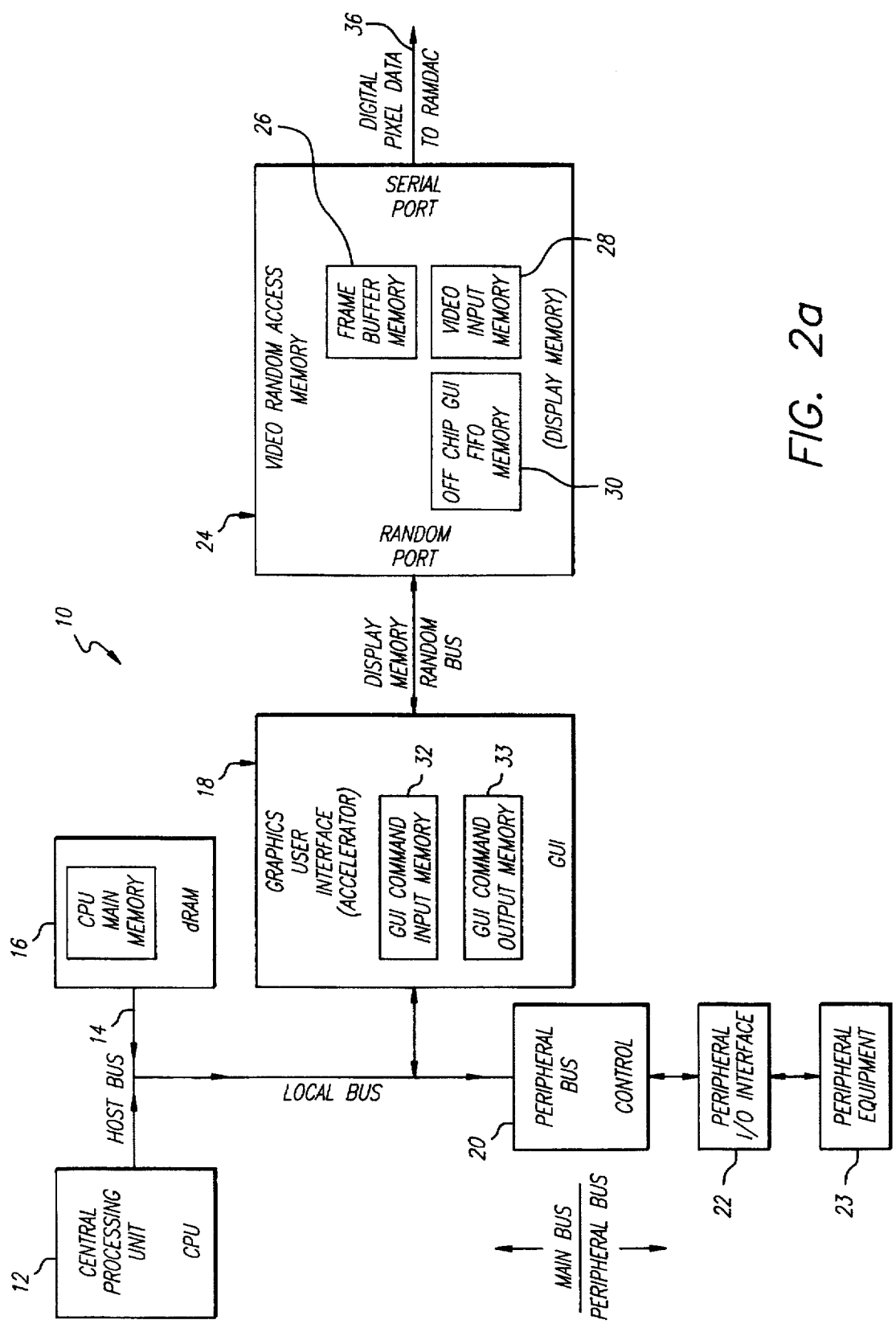
FIG. 2a is a simplified block diagram of a system constituting one embodiment of the invention and employing a local bus for providing commands from a central processing unit (CPU) to hardware including a graphics user interface and a display memory and for processing data (e.g. graphics) in the display memory in accordance with such commands.

FIG. 2a is a simplified block diagram of one embodiment, generally indicated at 10, of a system constituting this invention for providing for an operation of hardware on the commands from the software without any polling by the software after the performance of each and every command. The system 10 includes a central processing unit (CPU) 12 which communicates over a host bus 14. The data portion of the host bus 14 is preferably thirty two (32) bits wide to accommodate the graphics command words, but it may provide any other number of bits, more or less than thirty two (32), without departing from the scope of the invention. The host bus 14 may also be considered as a local bus in its connection to the CPU 12 and to a graphics user interface generally indicated at 18.

A CPU main memory 16 is also connected to the host bus 14. The CPU main memory 16 may constitute a dynamic random access memory (dRAM) for storing the software commands. A peripheral bus control 20 may also be coupled to the host bus 14. The peripheral bus control 20 may in turn be connected to a peripheral interface indicated at 22. The peripheral interface 22 is in turn coupled to peripheral equipment 23. An example of such peripheral equipment is a printer. The peripheral bus control 20, the peripheral interface 22 and the peripheral equipment 23 are well known in the prior art.

A video random access memory (VRAM) generally indicated at 24 is connected to the graphics user interface 18. The memory 24 may include at least three (3) different portions. One portion may constitute a frame buffer memory 26 for storing graphics information in digital form. Another portion may constitute a video input memory 28 for storing video information in digital form. A third portion may constitute a GUI FIFO memory 30 for storing graphics commands. The GUI FIFO memory 30 receives the commands from the GUI interface 18 and passes the commands, after a delay, from the memory 30 in the same order as received. The provision of the GUI FIFO memory 30 in the display memory 24 with digital data such as graphics and video is considered to be unique to this invention.

A system for, and a method of, processing graphics and video information recorded in a common memory such as the memory 24 is disclosed and claimed in application Ser. No. 08/014,359 filed on Feb. 5, 1993, now U.S. Pat. No. 5,406,306, in the names of Jonathan I. Siann, Conrad M. Coffey and Jeffrey L. Easley for a "System For, and Method of, Displaying Information from a Graphics Memory and a Video Memory on a Display Monitor", this application being assigned of record to the assignee of record of this application. A system for, and a method of, processing graphics and video information recorded in a common memory such as the memory 24 is also disclosed and claimed in application Ser. No. 08/214,787 filed on Mar. 16, 1994, by David C. Baker and Jonathan I. Siann for a "Multimedia Graphics System", this application also being assigned of record to the assignee of record of this application. Reference may be made to such co-pending applications to complete the disclosure in this application if the disclosure in this application should in any way be considered as incomplete.

The CPU 12 stores the data and program software for operating the system 10. The resultant graphics commands from the CPU 12 are introduced to the host bus 14. Other commands in the CPU 12 are introduced through the peripheral bus control 20 to the peripheral interface 22. The peripheral interface 22 operates upon such data in accordance with the commands from the CPU main memory 16. For example, the interface may include input-output (I/O) buffers for communicating with the peripheral equipment 23 such as a line printer. Such a printer may print a page outputting the rasterization of the graphics data in the frame buffer memory 26 in accordance with the commands from the CPU 12.

The commands and the data from the CPU 12 are introduced to the graphics user interface (GUI) 18 which is considered to be unique to this invention. The graphics user interface 18 includes a GUI command input memory 32 and a GUI command output memory 33 which normally receive the commands from the CPU 12 and which process the digital data from the frame buffer memory 26 (representing graphics) in accordance with such commands. The memories 32 and 33 may constitute shift registers which receive the commands at one end and pass the commands from the other end, after a delay, in the same order as when received. Thus, the memories 32 and 33 may constitute FIFO's.

Each of the memories 32 and 33 in the graphics user interface 18 has a limited capacity. In the normal operation, the input memory 32 receives the commands from the CPU 12 through the host bus 14 and passes the commands to the memory 33. The output memory 33 then passes the commands to image rasterization circuitry in the graphics user interface (GUI) 18. This circuitry processes the graphics commands from the CPU 12 and outputs pixel data as a result of such processing. Such pixel data may digitally represent an image. This digital data may be converted to analog data which may then be converted to pixel intensities of the resultant image for display on a video monitor.

Since the output memory 33 in the graphics user interface 18 has a limited capacity, it may occasionally become full. When the memory 33 becomes full, the graphics user interface 18 operates to provide for the passage of the commands from the input memory 32 through the GUI FIFO memory 30 in the video random access memory (VRAM) 24 and then through the output memory 33. The GUI FIFO memory 30 accordingly functions as an auxiliary memory for receiving the commands which would otherwise overflow the memory 33.

When the GUI FIFO memory 30 receives the commands which would otherwise overflow the memory 33, it continues to operate in this capacity until there are no commands in the GUI FIFO memory 30. Upon such an occurrence, the commands pass again from the input memory 32 directly to the output memory 33 and then outwardly from the memory 33 to the image rasterization circuitry in the graphics user interface 18.

By providing the interrelationship between the memories 32 and 33 in the graphics user interface 18 and the GUI FIFO memory 30 in the display memory 24 as discussed above, the system shown in FIG. 2a eliminates any polling of the graphics user interface after each command except under isolated circumstances which will be described in detail subsequently. This polling is provided in the prior art to determine if the graphics user interface of the prior art has completed the processing of data at each vertex in accordance with each command. By eliminating such polling, the system of this invention provides a considerable enhancement in the rate at which data may be processed. Since the polling of each vertex requires approximately four hundred and eighty nanoseconds (480 ns) and since there are a plurality of vertices in the performance of commands, the virtual elimination of polling as in this invention represents a considerable savings in time.

The graphics image data stored in the frame buffer memory 26 passes in one embodiment from the frame buffer memory through a bus 36 to stages including a random access memory and a digital-to-analog converter for a conversion from digital values to corresponding analog values. These stages are often designated as "RAMDAC" stages (constituting the first initials of "random access memory" and "digital analog converter"). The "RAMDAC" stages are well known in the art. In such an embodiment, the data usually is passed in packets through the bus 36 in synchronism with the pixel clock of the video display.

Figure 2B:
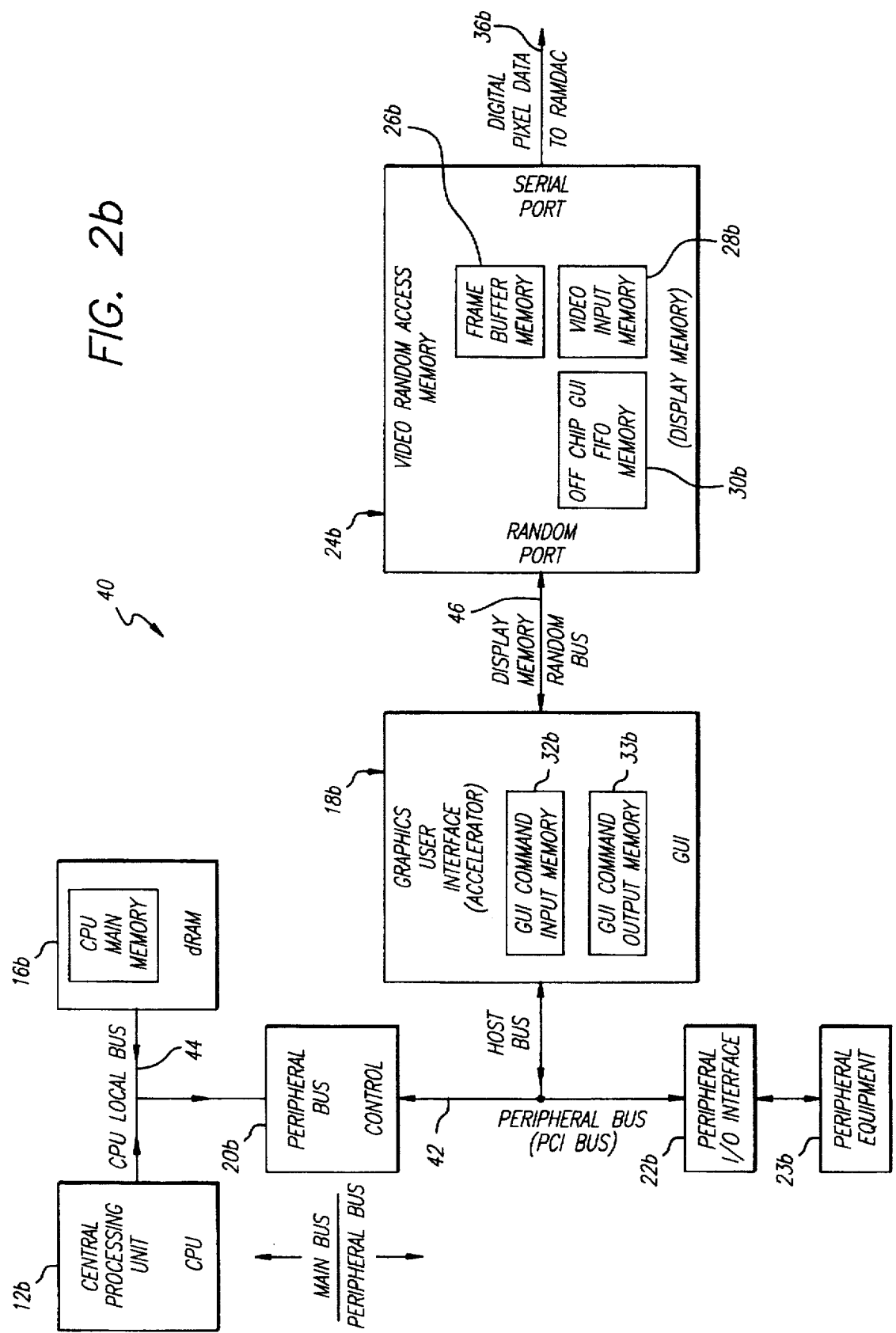
FIG. 2b is a simplified block diagram of a system constituting another embodiment of the invention and employing a peripheral bus for providing commands from a central processing unit (CPU) to hardware including a graphics user interface and a display memory and for processing data (e.g. graphics) in the display memory in accordance with such commands.

FIG. 2b shows the same blocks as shown in FIG. 2a but in a different interrelationship than that shown in FIG. 2a. The arrangement of the blocks shown in FIG. 2b is generally indicated at 40 and is provided for use with a bus designated in the trade as the "PCI" bus and indicated at 42 in FIG. 2b. FIG. 2b may be considered to be a preferred embodiment since it incorporates the "PCI" bus 42 which is considered to be the host bus of the future. One reason for this architecture is that it may be desirable in future applications to operate the local bus 44 with words in excess of thirty two (32) bits. For example, the local bus 44 may be operated with words of one hundred and twenty eight (128) bits to attain higher main-memory bandwidths.

In the embodiment shown in FIG. 2b, the stages are identified by the same numerals as the stages shown in FIG. 2a except that the stages are further designated by the suffix "b". For example, the central processing unit (CPU) is designated as 12b. The CPU 12b, the CPU main memory 16b and the input of the peripheral bus control 20b are connected to a CPU local bus 44. Connections are made to the peripheral bus 42 from the output of the peripheral bus control 20b, the peripheral I/O interface 22b and the input to the graphics user interface 18. The output of the graphics user interface 18b and the input to the video random access memory (VRAM) 24b share a common bus 46. The graphics data from the video random access memory 24b passes through the line 36b to the equipment designated as "RAMDAC" in a manner similar to that provided for the graphics data in the embodiment shown in FIG. 2a.

The system shown in FIG. 2b operates essentially the same as the system shown in FIG. 2a except that the peripheral bus control 20b is disposed between the local bus 44 and the graphics user interface 18*b*. Because of this substantially common functionality, the system shown in FIG. 2*b* operates in a manner similar to that of FIG. 2*a* to preclude polling (except under rare circumstances) of the graphics user interface 18*b* by the device driver software in FIG. 1 after each graphics command.

Figure 2C:
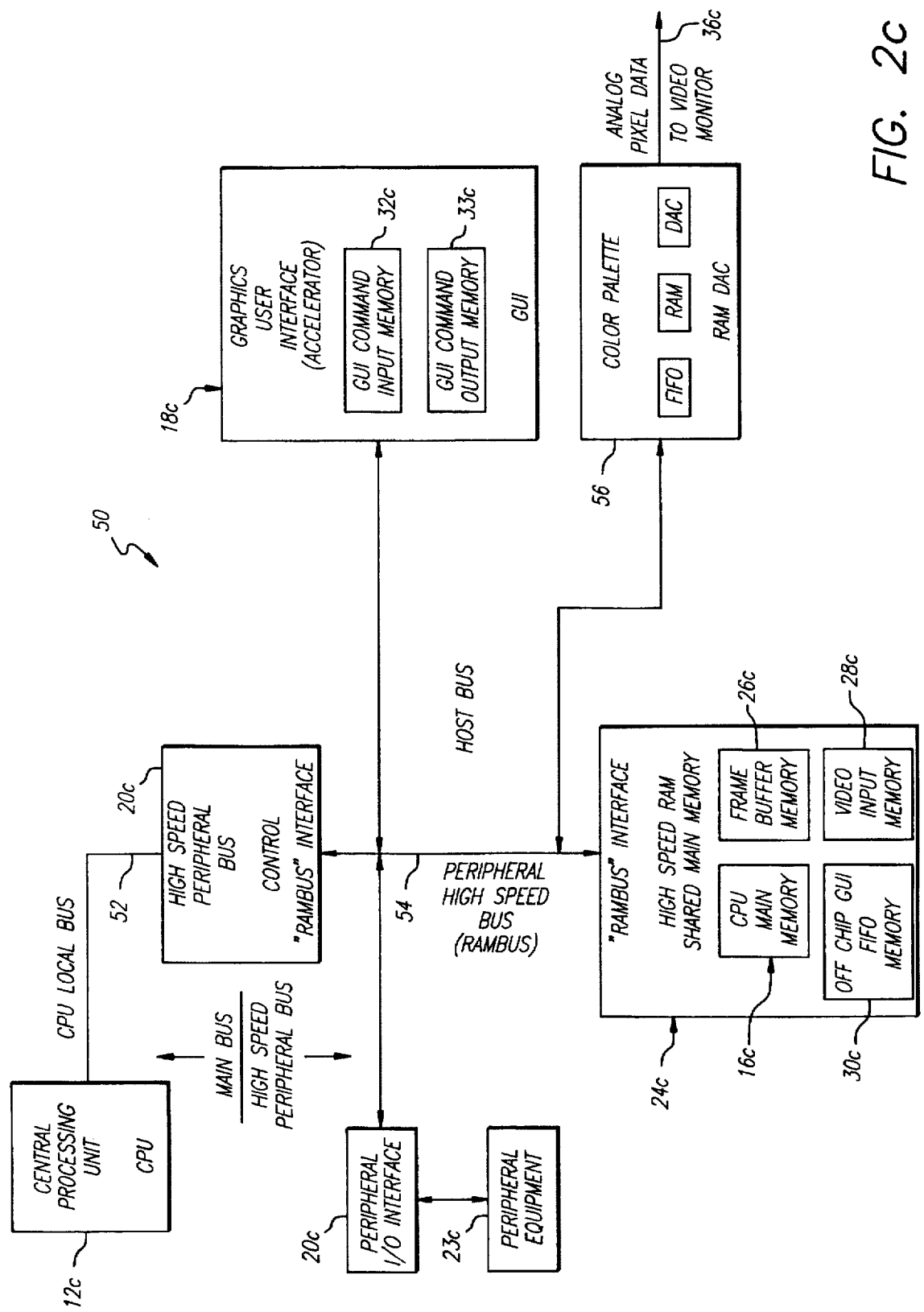
FIG. 2c is a simplified block diagram of a system constituting a third embodiment of the invention and employing a high speed bus common to all of the hardware for providing commands from a central processing unit (CPU) to hardware, including a graphics user interface and a high speed random access shared main memory, for processing data (e.g. graphics) in the main memory in accordance with such commands.

FIG. 2*c* is intended to operate in a system with a high-speed random-access-memory bus designated as "Rambus". The "Rambus" system is well known in the art. For example, International application PCT/US 91/02590 published on Oct. 31, 1991, discloses such a system. The system shown in FIG. 2*c* has the same blocks as the systems shown in FIGS. 2*a* and 2*b* but has a different arrangement of such blocks than the arrangements shown in FIGS. 2*a* and 2*b*. These blocks are identified in FIG. 2*c* with the same numerals as the blocks in FIGS. 2*a* and 2*b* but with the suffix "c".

The system shown in FIG. 2*c* is generally indicated at 50. In the embodiment shown in FIG. 2*c*, a local bus 52 is connected between the CPU 12*c* and the high speed peripheral bus control 20*c*. All of the other stages in the system 50 and the high speed peripheral bus control 20*c* are connected to a high speed bus 54 (designated as "RAMBUS"). Thus, all of the communication between the different stages (other than the CPU 12*c*) occurs through the high speed bus 54.

Since essentially all of the communications occur through the high speed bus 54, the communications can occur at a faster rate than in the systems shown in FIGS. 2*a* and 2*b*. Furthermore, in FIG. 2*c*, the RAMDAC is shown as a single block 56 and the output (constituting analog pixel data) is shown as passing on a line 36*c* to a video monitor. As will be appreciated, however, the embodiment shown in FIG. 2*c* has substantially the same advantages as the embodiments shown in FIG. 2*a* and 2*b*. For example, the embodiment shown in FIG. 2*c* processes graphics data in accordance with successive commands without requiring the device driver software (except under rare exceptions) to poll the hardware as to whether the hardware has completed the processing of data in accordance with each command before processing data in accordance with the next command.

The embodiments shown in FIGS. 2*a* and 2*b* include a video random access memory (VRAM) 24. A video random access memory 24 has certain advantages because it operates at a relatively high serial output clock speed and because it includes a serial output register for shifting out digital data taken from different positions in the frame buffer memory. However, other types of memories can be used without departing from the scope of the invention. These include a high speed dynamic random access memory (dRAM) such as illustrated in FIG. 2*c* and a synchronous dynamic random access memory. Actually, the embodiment shown in FIG. 3*b* and discussed in some detail subsequently incorporates a synchronous dRAM.

FIG. 3*a* (broken into two (2) parts as FIG. 3*a*(1) and 3*a*(2)) shows schematically in additional detail, but still in block form, the graphics user interface 18 and the video random access memory or display memory 24 also shown in FIG. 2*a*. The graphics user interface (GUI) 18 is preferably disposed on an integrated circuit chip which is shown in FIG. 3*a* in broken lines as a rectangle 60. The video random access memory 24 is shown in broken lines as a separate rectangle and is separate from the chip 60. The interrelationship between the graphics user interface 18 and the video random access memory 24 is indicated schematically at the left end of FIG. 3*a* by a horizontal line 61. This interrelationship is further indicated by a designation above the line 61 of "on chip" adjacent a vertical line with an upwardly pointing arrow. It is also indicated by a designation below the line 61 of "off chip" adjacent a vertical line with a downwardly pointing arrow.

The host bus is the local bus 14 (also shown in FIG. 2*a*) which is connected to a host bus interface and FIFO 62 on the chip 60. The FIFO 62 may have a limited capacity such as four (4) words. This FIFO corresponds to the GUI command input memory 32 in FIG. 2*a*. The number of bits in each word in the FIFO 62 may correspond to the data width (32) of the bus 14. The input data from the host bus to the FIFO 62 may be loaded by a clock signal on a line 64 extending from a host bus interface FIFO controller 66 which is disposed on the chip 60. This input clock may have a frequency such as twenty five megahertz (25 Mhz) corresponding to the frequency in the CPU 12 in FIG. 2*a*.

Addresses controlling the operation of the chip 60 may be provided on the address portion 63 of the host bus from the CPU 12 to the host bus interface FIFO controller 66. These addresses may constitute twenty four (24) bits, this being the number of bits provided in each address by the CPU. A CPU ready line 65 is connected (the connection not being shown in FIG. 3*a*) from the controller 66 to the CPU 12 to halt the transmission of commands by the CPU over the host bus when the host bus FIFO 62 is full.

A clock signal on a line 68 from the controller 66 causes the host bus FIFO 62 to shift out new data. This clock signal may have a suitable frequency such as approximately fifty megahertz (50 Mhz). The host bus interface and FIFO 62 may also receive data through a bus 69 from an up/down counter 70 disposed on the chip 60. The data on the bus 69 provides an indication of the total storage depth available in the off chip GUI FIFO memory 30, the host bus and interface FIFO 62 and an on chip GUI hardware FIFO 98. This data may be used by the device driver software to determine when graphics command transmission should be halted.

The output of the host bus interface and FIFO 62 is introduced to a movable arm in a switch 72 which is shown schematically as having a single-pole double-throw construction. Actually, the number of poles corresponds to the width of the bus (32-wide). The switch 72 is shown as being included in a stage 74 disposed on the chip 60 and designated as a "bus switch bypass path". A single-pole double-throw switch 76 corresponding to the switch 72 is also included in the bus switch bypass path 74. Although the switches 72 and 76 are shown as mechanical switches for purposes of illustration, it will be appreciated that the switches will preferably constitute multi-pole electronic switches such as formed from transistors disposed on the integrated circuit chip 60.

The upper stationary contacts (the upper contacts) of the switches 72 and 76 are common as by a connecting line 78. The other stationary contacts (the lower contacts) of the switches 72 and 76 are respectively connected through lines 73 and 75 to the input and output ends of the off chip GUI FIFO memory 30 (also shown in FIG. 2*a*) in the display memory 24. Commands are written through the bus 73 into the input of the GUI FIFO memory 30 and are read through the bus 75 from the output of the GUI FIFO memory. The commands may pass to and from the off chip GUI FIFO 30 (also shown in FIG. 2*a*) at a suitable frequency such as approximately twenty five megahertz (25 Mhz). This is less than the frequency at which the commands may be clocked out of the FIFO 62. However, the commands can pass through the FIFO 30 at a frequency up to or equal to the output frequency of the FIFO 62 without departing from the scope of the invention.

The operation of the switches 72 and 76 is shown in FIG. 3a(1) as being controlled by inputs through a line 81 (designated as "bus switch control") to the movable arms of the switches from a GUI FIFO controller 82 (FIG. 3a(2)) which is disposed on the chip 60. The controller 82 receives inputs designated as "new output" on a line 84 from the host bus interface FIFO controller 66 and requests new data outputs from the FIFO on the "new data request" line 86 to the controller 66.

The up/down counter 70 in FIG. 3a(1) has several connections to the GUI FIFO controller 82 in FIG. 3a(2). For example, clock signals at a suitable frequency such as approximately fifty megahertz (50 Mhz) pass on a line 88 from the controller 82 to the counter 70. The clock signals cause the up/down counter 70 to count up or down by one count in accordance with the logic level of a "U/D" or up/down control line 90. The actual count in the counter 70 is monitored through a bus 92 to the controller 82. The counter 70 indicates the number of the commands in the off chip GUI FIFO memory 30. The same count may also be used to determine the available storage space remaining in the off chip FIFO 30. This information is provided to the host bus interface 62 over the line 69 in FIG. 3a(1).

Similar connections are made between the GUI FIFO controller 82 (FIG. 3a(2)) and an up/down counter 96. The up/down counter 96 indicates the number of commands in the GUI hardware FIFO 98 which is disposed on the chip 60. One of the connections between the GUI FIFO controller 82 and the up/down counter 96 is through a line 100 which introduces clock signals at a suitable frequency such as fifty megahertz (50 Mhz) from the controller 82 to the counter 96. The clock signals cause the up/down counter to count up or down by one count in accordance with the logic level of the "U/D" or up/down control line 102. A third one of these connections is through a bus 104 to provide an indication to the controller 82 of the number of commands stored in the on chip GUI hardware FIFO 98.

The on chip GUI hardware FIFO 98 stores a limited number of commands. For example, the FIFO 98 may have a capacity of eight (8) commands. Eight (8) is a desirable number because it constitutes the number of words in a BLIT command. A BLIT generally defines the corners of two superimposed rectangles as produced by the graphics device interface software in FIG. 1. The FIFO 98 receives the commands on the movable arm of the switch 76 (FIG. 3a(1)) through a bus 106. The FIFO 98 passes the commands through a bus 108 to an on chip graphics engine 110 (FIG. 3a(2)) on the chip 60. These commands may pass through the bus 108 at a suitable frequency such as approximately fifty megahertz (50 Mhz).

The on chip graphics engine 110 shown in FIG. 3a(2) rasterizes the graphics commands and provides pixel data through a bus 112 to the frame buffer memory 26 also shown in FIG. 2a. This pixel data is written into the frame buffer memory 26. The video output data from the frame buffer memory 26 is introduced to the bus 36 also shown in FIG. 2a. This output may be provided on a serial basis at a suitable frequency such as approximately sixty six megahertz (66 Mhz). Multiple VRAM chips can be used to provide the wide-bus serial output at a frequency as high as sixty six megahertz (66 Mhz).

The on chip graphics engine 110 also provides addresses through a line 118 to a RAM controller 114 disposed on the chip 60. The RAM controller 114 provides on a bus 116 signals controlling the addresses for the read and write operations in the frame buffer 26. The RAM controller 114 also provides arbitration for similar address control signals passing through a bus 119 from the GUI FIFO controller 82.

The commands from the CPU 12 in FIG. 2a pass through the host bus 14 to the host-bus interface and FIFO 62 in FIG. 3(a)(1). In the normal operation of the system shown in FIGS. 3a(1) and 3a(2), the commands then pass through the command input FIFO 62 and through the switches 72 and 76 (in the upper positions of the movable arms of the switches) and through the bus 106 to the command output FIFO 98 (FIG. 3a(2). After a delay for the passage of the commands through it, the output FIFO 98 then passes the commands through the bus 108 to the on-chip graphics engine 110. These commands control the operation of the graphics engine 110 in rasterizing the graphics data for output to the frame buffer 26.

The resultant pixel data is introduced to the frame buffer 26 for recording the video image in the frame buffer. The writing of the pixel data into the frame buffer 26 is controlled by addresses introduced from the graphics engine 110 through the memory address bus 118 to the RAM controller 114. The RAM controller 114 arbitrates the writing of the pixel data from the graphics engine 110 at image positions in the frame buffer 26 and writes the command FIFO information in the off chip GUI FIFO memory 30 in accordance with addresses provided by the GUI FIFO controller 82.

The counter 96 indicates at each instant the number of commands in the FIFO 98 and provides this indication on the bus 92. It may sometimes happen that the GUI hardware FIFO 98 may become full. Under such circumstances, the next command from the input FIFO 62 (FIG. 3a(1)) cannot pass into the output FIFO 98. When this occurs, the GUI FIFO controller 82 (FIG. 3a(2)) introduces a signal through the line 81 to the switches 72 and 76 (FIG. 3a(1)) to trigger the movable arms of the switches from engagement with the upper stationary contacts into engagement with the lower stationary contacts. This causes the commands to pass from the input FIFO 62 through the switch 72 into the off chip GUI FIFO memory 30 in the display memory 24. These commands control the processing of data in the graphics data as described above.

The off chip GUI FIFO memory 30 may have a storage capacity which is adjustable in accordance with the desires or needs of the user. For example, the memory 30 may store a number of words through an adjustable range between approximately five hundred and twelve (512) words and approximately sixty four thousand (64,000) words. In selecting the number of words for the FIFO 30, the user has to balance equities. If the user provides a relatively small storage capacity for the FIFO 30, he maximizes the storage capacity of the graphics frame buffer memory 26 and the video input memory 28 both of which share the total VRAM storage capacity as shown in FIG. 2(a). However, the user increases the possibility that the FIFO 30 will quickly become full. This is undesirable because there will be no place for additional commands from the FIFO 62 to be stored. On the other hand, if the user increases the storage capacity of the FIFO 30, the FIFO will not become full easily but the space available for the buffer memory 26 and the video input memory 28 will be reduced.

The provision of the FIFO's 62 and 98 on the chip 18 offers certain advantages. This results from the fact that the FIFO's 62 and 98 operate at a faster rate, because they are on the chip 18, than the off chip GUI FIFO memory 30. Because of this, the hardware and software in this invention operate to provide the commands in the FIFO's 62 and 98 on the chip 18 as much as possible.

When the FIFO 30 is inserted into the command loop between the input FIFO 62 and the output FIFO 98, it serves as an auxiliary memory to store commands. The FIFO 30 continues to operate as an auxiliary storage until there are no commands remaining in the FIFO. At such a time, the count in the counter 70 (which indicates the number of commands in the FIFO 30 at each instant) indicates a count of zero. This causes the GUI FIFO controller 82 (which receives the count indication from the counter 70) to actuate the movable arms of the switches 72 and 76 into engagement with the upper stationary contacts of the switch. The FIFO 62 and the FIFO 98 then operate again to pass the commands from the CPU host bus 14 directly (without passing through the memory 30) to the graphics engine 110 for processing.

The software maintains a running estimate of the total number of commands at any instant in the off chip GUI FIFO 30 and in the on chip FIFO's 62 and 98. When the estimate in the software is that the off chip GUI FIFO 30 and the on chip GUI FIFO's 62 and 98 are substantially full, the software polls the counter 130 (FIG. 3a(1)) to determine the remaining storage depth available in the FIFO's 62 and 98 and the memory 130. The counter 130 indicates at each instant the total number of commands in the on-chip FIFO's 62 and 98 and the off-chip GUI FIFO memory 30. This polling is provided because the software knows only of the commands being transferred to the on chip FIFO 62 and does not know of the commands being transferred from the FIFO 98. When queried in this manner (FIG. 3a(1)), the counter 130 transmits, through the FIFO depth bus 69 to the host bus interface 62, the total number of commands in the on-chip FIFO's 62 and 98 and in the off-chip GUI FIFO memory 30. The host bus interface 62 then transmits this information through the bus 14 to have the depth count in the software updated to the actual count provided by the counter 130.

The counter 130 is designated in FIG. 3a as "UP/DOWN COUNTER FOR ON-CHIP and OFF-CHIP FIFO's." An up-down line 131 is provided to indicate the commands passing to the FIFO 62 and passing from the FIFO 98. This causes the bus 69 to indicate at each instant the total number of commands in the FIFO's 62 and 98 and in the GUI FIFO memory 30. Clock signals are provided on a line 132 connected to the counter 130.

It will be appreciated that this type of query from the software to the counter 130 will be relatively infrequent. One reason is that the capacity of the off chip GUI FIFO 30 will be chosen to be large, typically approximately 1K words. It will also be appreciated that the frequency of such near-full occurrences will be progressively decreased even further as the capacity of the off chip GUI FIFO 30 is progressively increased from 512 commands to 64,000 commands.

It may frequently happen that the host bus interface FIFO 62 becomes full. When this occurs, the host bus interface FIFO controller 66 makes the voltage on the CPU ready line 65 low. When the voltage on the CPU ready line 65 becomes low, the CPU is prevented from transmitting any additional commands over the local bus 14 in FIG. 2a to the memory or to the peripheral equipment 23 in FIG. 2a to operate the peripheral equipment such as servicing disk drive data transmission.

If the CPU ready line 65 remains low continuously for an extended period of time such as several microseconds, disk drive data may be lost. To prevent this from happening, a GUI command passes from the CPU 12 to the host bus interface and FIFO 62 (FIG. 3a(1)). This occurs only when the off chip GUI FIFO 30 is one (1) or more words short of being full. When the off chip GUI FIFO 30 accepts this word from the input FIFO 62, it communicates a command through a bus 122 to the GUI FIFO controller 82. This causes the GUI FIFO controller 82 to shift the commands in the input FIFO 62 one position to the right in the input FIFO, making the input FIFO available to store a new command word. The interface FIFO controller 66 then causes the voltage on the ready line 65 to become high. The CPU 12 is now able to pass commands through the peripheral interface in FIG. 2a to operate the memory or the peripheral equipment 23.

When the device driver software predicts that the off chip GUI FIFO 30 is one (1) word short of being full, the flow of graphics commands from the CPU is halted. The depth available in the FIFO 30 is then polled by the device driver software through the line 69 from the up/down counter 70. The available count remaining in the off chip GUI FIFO 30 is updated in the software and no graphics commands are transmitted by the CPU 12 until the predicted depth available in the GUI FIFO 30 is greater than 1. While graphics commands are halted, other commands may be transmitted over the local and peripheral buses because the voltage on the CPU ready line 65 is high.

FIGS. 3b(1) and 3b(2) show an embodiment similar to that shown in FIG. 3a and described above. However, the embodiment shown in FIG. 3b uses a synchronous dynamic random access memory (dRAM) as the display memory 24b. Although the memory has a single synchronous parallel port, signal flow in and out of the GUI FIFO 30 and the frame buffer memory 26 is schematically shown on four (4) separate lines for purposes of explanation. Because of this, the pixels read from the frame buffer 26 in the display memory 24 are introduced through a bus 131 to the integrated circuit chip 60. The integrated circuit chip 60 then passes the pixel data through a bus 132 to the RAMDAC stages or the PACDAC stages. The pixel data may pass through the buses 131 and 132 at a suitable frequency such as fifty megahertz (50 Mhz).

FIGS. 3c(1) and 3c(2) show the graphic user interface (GUI) 18c of FIG. 2c in additional detail but does not show the interrelationship of the graphics user interface 18 and the display memory 24c in additional detail. The reason is that both the graphic user interface 18c and the display memory 24c communicate with the high speed peripheral bus 54 in FIG. 2c. The high speed peripheral bus 54 is also shown in FIG. 3(c)(1).

As in the previous embodiments, the graphics user interface 18c is disposed on an integrated circuit chip, this chip being indicated at 60c in FIG. 3c. Furthermore, the chip includes all of the stages shown in FIGS. 3a and 3b, these stages having the same numerical designations as the corresponding stages shown in FIG. 3a but with the suffix "c" following these numerical designations. A high speed combined memory bus auxiliary control and interface 140 is also disposed on the chip. The auxiliary control and interface 140 writes graphics commands onto the high speed bus 54 from the input switch 72 and reads graphics commands from the bus 54 into the output switch 76 54.

The graphics engine 110c writes pixel data through the line 112c into the auxiliary control and interface 140 which then passes the pixel data to the bus 54. The pixel address from the graphics engine 110c is written through the line 118c into the auxiliary control and interface 140 which then passes the pixel address into the bus 54. The GUI FIFO controller 82c provides the write/read address of the graphics command on a line 116c to the auxiliary control and interface 140 and provides the command word on the bus 54. Commands are transferred through a bus 142 from the auxiliary control and interface 140 to the host bus interface and FIFO 62c. Status and control information passes between the auxiliary control and interface 140 and the host bus interface FIFO controller 66c through a bus 144. As previously described, FIGS. 3a(1) and 3a(2) show the connections to the display memory 24 on a schematic basis to enhance an understanding of the operation of such system.

FIG. 4a(1) and 4a(2) are substantially the same as FIGS. 3a(1) and 3a(2) except that the buses 112 and 116 and the buses 73 and 75 respectively extending between the switches 72 and 76 and the off chip GUI FIFO 30 are replaced by a bus 150 providing thirty two (32) bit data words, a control bus 152 and a ten (10) bit address bus 154. The buses 150, 152 and 154 provide communication between a display memory bus interface 156 and the display memory 24. The bus interface 156 receives command write information through a bus 158 from the switch 72 and write/read address control information from the off chip RAM controller 114 through a bus 160 and provides command read information through a bus 163 to the switch 76. The pixel write data is supplied through a bus 162 from the on chip graphics engine 110.

FIGS. 4b(1) and 4b(2) are substantially the same as FIGS. 3b(1) and 3b(2) except that they incorporate the changes discussed above for FIGS. 4a(1) and 4a(2). However, the numerical designations individual to the embodiment shown in FIGS. 4a(1) and 4a(2) are the same in FIGS. 4b(1) and 4b(2) except that they are followed by the suffix (b). For example, the designation 150b in FIG. 4b(2) corresponds to the designation 150 in FIG. 4a(2).

The system and method described above have certain important advantages. They provide for the transfer of commands from software to hardware and the processing of such commands in the hardware with infrequent polling of the hardware by the software to determine if the hardware has processed such commands. As will be appreciated, this significantly enhances the rate at which the system and method of this invention are able to process the commands from the CPU.

The system and method of this invention are also advantageous in providing the FIFO's 62 and 98 of limited capacity in an integrated circuit chip and in providing the memory reservoir 30 in the display memory off the chip. By providing such an arrangement, commands are normally able to pass at high rates from a CPU to the FIFO's 62 and 98 of the limited capacity on the chip for processing. When the FIFO's 62 and 98 of the limited capacity become full, the commands pass to the FIFO memory 130 through the FIFO 62 and from the memory 130 to the other FIFO 98 for processing. The system and method of this invention are further advantageous in that they operate to insure that a ready line will provide a voltage which will allow the CPU to communicate with other equipment such as peripheral equipment when the FIFO's and the memory reservoir become substantially full.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for use with means for providing commands, first means for providing a first shift register, the first means having first and second ends and being constructed to receive input commands at the first end from the command providing means and to pass the commands from the second end in the same order as received, second means for providing a second shift register, the second means having first and second ends and being constructed to receive commands from the first means at the first end and to pass the commands from the second end in the same order as received, third means for providing a third shift register, the third means having first and second ends and being constructed to receive commands from the first means at the first end and to pass the commands from the second end in the same order as received, fourth means having first and second operative relationships and operative in the first relationship to provide for the passage of the commands from the second end of the first means to the first end of the second means and operative in the second relationship to provide for the passage of the commands from the second end of the first means to the first end of the third means and then from the second end of the third means to the first end of the second means, fifth means for providing for a change in the fourth means from the first operative relationship to the second operative relationship upon the occurrence of a particular state of operation in the second means, sixth means for providing data, and seventh means for processing the data from the sixth means in accordance with the commands passing from the second end of the second means.

2. In a combination as set forth in claim 1 wherein the third means and the sixth means are provided on different portions of a display memory.

3. In a combination as set forth in claim 2 wherein an integrated circuit chip is provided and wherein the first and second means are provided on the integrated circuit chip and the display memory is disposed off the integrated circuit chip.

4. In a combination as set forth in claim 2 wherein the fourth means continues in the second operative relationship, after being changed from the first operative relationship to the second operative relationship, until the occurrence of a particular operative relationship in the third means and wherein the fourth means is changed to the first operative relationship upon the occurrence of the particular operative relationship in the third means.

5. In combination for use with means for providing commands, first means for providing a first shift register, the first means having first and second ends and being constructed to receive input commands at the first end from the command providing means at a first particular rate and to pass the commands from the second end at a second particular rate different from the first particular rate in the same order as received, second means for providing a second shift register, the second means having first and second ends and being constructed to receive input commands at the first end at the second particular rate and to pass the commands from the second end at the second particular rate in the same order as received, third means for receiving the commands from the second end of the first means and for passing the commands to the first end of the second means at a third particular rate different from the first particular rate, fourth means operative in first and second relationships and operative in the first relationship to pass the commands directly from the second end of the first means to the first end of the second means at the second particular rate and operative in the second relationship to direct the commands from the second end of the first means to the third means at the second particular rate and then to the first end of the second means at the second particular rate, fifth means for providing data, and sixth means for processing the data from the fifth means in accordance with the commands passing through the second end of the second means.

6. In a combination as set forth in claim 5, the third means being operative to delay the commands passing from the second end of the first means to the third means before introducing the commands to the first end of the second means.

7. In a combination as set forth in claim 6, the fourth means being operative in the second relationship during the time that the commands are passing from the second end of the first means through the third means to the first end of the second means at the third particular rate.

8. In a combination as set forth in claim 5, the fourth means being operative in the first relationship until the second means becomes filled with commands passing from the second end of the first means to the first end of the second means at the first particular rate and the fourth means being thereafter operative in the second relationship during the time that the commands are passing from the second end of the first means through the third means to the first end of the second means at the third particular rate.

9. In a combination as set forth in claim 5, seventh means for indicating at each instant the number of commands in the second means, and means responsive to a particular count of the commands in the second means for converting the fourth means from the first operative relationship to the second operative relationship.

10. In a combination as set forth in claim 9 wherein the particular count in the second means indicates that the second means is filled with commands and wherein the third means thereafter receives the commands passing through the first means until there are no commands in the third means.

11. In combination, means for providing commands, first means for receiving the commands from the command providing means and for passing the commands from the first means after a first particular delay, second means for receiving the commands from the first means and for passing the commands from the second means after a second particular delay, third means for receiving the commands from the first means and for passing the commands from the third means to the second means after a third particular delay, fourth means operatively coupled to the first, second and third means and having first and second operative relationships and operative in the first relationship for providing for the passage of the commands from the first means to the second means after the first particular delay and operative in the second relationship for providing for the passage of the commands from the first means to the third means after the first particular delay and thereafter from the third means to the second means after the third particular delay, and fifth means for providing for the operation of the fourth means in the first relationship until an inability of the second means to receive the commands from the first means and for thereafter providing for the operation of the fourth means in the second relationship.

12. In a combination as set forth in claim 11, the fifth means providing for the operation of the fourth means in the second operative relationship, after the beginning of the operation of the fourth means in the second relationship, until there are no commands in the third means.

13. In a combination as set forth in claim 11, the first means having a first particular capacity, the second means having a second particular capacity greater than the first particular capacity and the third means having a third particular capacity greater than the second particular capacity, and sixth means for maintaining the operation of the fourth means in the second relationship during the time, after the change in the operation of the fourth means from the first relationship to the second relationship, that commands exist in the third means.

14. In a combination as set forth in claim 11, sixth means operative to prevent the first means from receiving any additional commands from the command providing means when the first means has become filled with commands, the sixth means being operative until the first means has become partially empty.

15. In a combination as set forth in claim 13, the fifth means providing for the operation of the fourth means in the second operative relationship, after the change in the operation of the fourth means to the second relationship, until there are no commands in the second means, sixth means for preventing the first means from receiving any additional commands from the command providing means when the first means has become filled with commands, peripheral equipment, the command providing means having a ready state and an unready state and being operative in the ready state to provide for the passage of commands to the peripheral means and being operative in the unready state to prevent such passage, seventh means for producing an operation of the command providing means in the unready state when the first means has become filled with commands, and eighth means for providing for the introduction of an additional command from the command providing means to the first means, upon the first means becoming partially empty, to convert the command providing means from the unready state to the ready state.

16. In a method of processing information, the following steps:

providing a plurality of commands for controlling the processing of the information, introducing the commands to an input of a first shift register means which has an output and which operates to pass the commands from the output, after a first particular delay, in the same order as received, introducing the commands from the output of the first shift register to an input of a second shift register means which has an output and which operates to pass the commands from such output, after a second particular delay, in the same order as received, introducing the commands from the output of the first shift register means to an input of a third shift register means which has an output and which operates to pass the commands from such output, in the same order as received, after a third particular delay and then introducing the commands from such output t6 the input of the second shift register means, normally providing for the introduction of the commands from the output of the first shift register means to the input of the second shift register means, providing for the introduction of the commands from the output of the first shift register means to the input of the third shift register means when the second shift register means becomes overloaded, and thereafter continuing the introduction of the commands from the output of the first shift register means to the input of the third shift register until there are no commands in the third shift register means.

17. In a method as set forth in claim 16, the steps of:

providing for an estimate at each instant of the extent to which the first, second and third shift register means are becoming overloaded on an aggregate basis, providing for an updating of the actual extent that the first and second and third shift registers have become overloaded on an aggregate basis when the estimate is that the overloading has occurred, and interrupting the transfer of commands to the first shift register means when the overloading of the commands in the first, second and third shift registers have actually occurred on an aggregate basis.

18. In a method as set forth in claim 17 wherein the step is in software of providing for an estimate at each instant of the extent to which the third shift register means is becoming overloaded and wherein the updating is to software of the actual extent that the first, second and third shift registers have become overloaded on an aggregate basis when the estimate in software is that the overloading has occurred.

19. In a method as set forth in claim 16, the steps of:

providing the first and second shift register means on an integrated circuit chip, and providing the third shift register means in a display memory separate from the integrated circuit chip.

20. In a method as set forth in claim 19, the steps of:

providing graphics data in the display memory, and processing the graphics data in accordance with the commands from the output of the second shift register means.

21. In a method as set forth in claim 16 wherein the first shift register means passes the commands through the first shift register means at a first particular rate, and the second shift register means passes the commands through the second shift register means at the first particular rate, and the third shift register passes the commands through the third shift register at a second particular rate different from the first particular rate.

22. In a method as set forth in claim 16 wherein the commands entering and leaving the second shift register means are counted to indicate the number of commands in the second shift register means at each instant and wherein the commands entering and leaving the third shift register means are counted to indicate the number of commands in the third shift register means at each instant and wherein the counts of the commands in the second and third shift registers means are used to control the passage of the commands directly from the first shift register means to the second shift register means or the passage of the commands from the first shift register means through the third shift register means to the second shift register means.

23. In a method as set forth in claim 22, including the steps of providing the first and second shift registers means on an integrated circuit chip, and providing the third shift register means in a display memory separate from the integrated circuit chip, providing graphics data in the display memory, and processing the graphics data in accordance with the commands from the output of the second shift register means.

24. In combination for use with means constructed to provide commands, first means for receiving the commands from the command providing means and for passing the commands through the first means at a first particular rate, second means responsive to the commands from the first means for passing the commands through the second means at the first particular rate, third means responsive to the commands from the first means for passing the commands through the third means at a second particular rate different from the first particular rate, fourth means responsive to the number of the commands in the second means for changing the passage of the commands from the first means to the second means to the passage of the commands from the first means through the third means to the second means, and fifth means responsive to the passage of the commands from the first means through the third means to the second means for thereafter continuing the passage of the commands from the first means through the third means to the second means until a particular number of commands exist in the third means.

25. In a combination as set forth in claim 24, the fifth means being operative to continue the passage of the commands from the first means through the third means to the second means until there are no commands in the third means and sixth means for storing data and seventh means responsive to the data stored in the sixth means for processing the data from the sixth means in accordance with the commands from the second means.

26. In a combination as set forth in claim 25 wherein the fourth means includes switching means operative in first and second relationships and operative in the first relationship to provide for a passage of the commands from the first means to the second means and operative in the second relationship to provide for a passage of the commands from the first means through the third means to the second means.

27. In a combination as set forth in claim 26 wherein the fourth means includes counter means operatively coupled to the second means for indicating the number of commands in the second means at each instant and wherein the fourth means changes the switching means from the first operative relationship to the second operative relationship when the counter means indicates the particular number of commands in the second means.

28. In a combination as set forth in claim 27 wherein the counter means constitutes first counter means and wherein the fifth means includes second counter means operatively coupled to the third means for indicating the number of commands in the third means and wherein the fourth means changes from the second operative relationship to the first operative relationship when the count in the third means reaches a value of zero after the fourth means has changed from the first operative relationship to the second operative relationship.

29. In combination, means for providing a plurality of commands, an integrated circuit chip, first memory means on the chip for receiving the commands from the command providing means and for passing the commands from the first means in the same order as received, second memory means on the chip for receiving the commands from the first memory means and for passing the commands from the second memory means in the same order as received, third memory means off the chip for receiving the commands from the first memory means and for passing the commands from the third memory means to the second memory means in the same order as received, first means for providing for the introduction of data from the command providing means to the third memory means, second means having first and second operative states and operative in the first state to provide for the passage of the commands from the first memory means to the second memory means and operative in the second state to provide for the passage of the commands from the first memory means through the third memory means to the second memory means, and third means for processing the data in the third memory means in accordance with the commands from the second memory means.

30. In a combination as set forth in claim 29 wherein the commands are stored in a first portion of the third memory means and wherein the data is stored in a second portion of the third memory means.

31. In a combination as set forth in claim 30, the second memory means having a particular capacity to store commands, and fourth means responsive to a storage of commands in the second memory means to the full capacity of the memory means for converting the second means from the first operative state to the second operative state and thereafter responsive to the absence of commands in the third memory means for converting the second means from the second operative state to the first operative state.

32. In a combination as set forth in claim 31, the first memory means having a first particular capacity to store commands, the second memory means having a second particular capacity to store commands, the means for providing a plurality of commands being operative to submit commands to other equipments than the first means, fifth means responsive to the storage of commands in the second and third memory means to the full capacities of the second and third memory means for producing a signal for preventing the command providing means from introducing commands to the other equipment, and sixth means responsive to the introduction of a command to the first memory means, after the operation of the fifth means in preventing the introduction of commands to the other equipment, for thereafter providing for the introduction of commands from the central processing unit to the other equipment.

33. In a combination as set forth in claim 29, fourth means responsive to the number of commands in the second and third memory means for providing for the operation of the second means in the first state at first particular times and in the second state at second particular times different from the first particular times.

34. In a combination as set forth in claim 33, fourth means responsive to a first particular number of commands in the second memory means for changing the operation of the second means from the first state to the second state, and fifth means responsive to a second particular number of commands in the third memory means for changing the operation of the second means from the second state to the first state.

35. In a method of processing information, the following steps:

providing application software, providing graphics device interface software in response to the application software, providing device driver software in response to the graphics device interface software to produce commands, providing a first memory for storing the commands from the device driver software, providing data in the first memory, providing a second memory for storing commands, the second memory having a smaller storage capacity than the first memory, providing a third memory for storing commands, the third memory having a smaller storage capacity than the first memory, providing for the introduction of the commands from the device driver software to the first memory, providing for the introduction of data to the first memory for storage in the first memory, each of the first, second and third memories being constructed to pass commands from such memory in the same order as received by such memory, providing for the passage of the commands in the second memory to the third memory, providing for the processing of data from the first memory in accordance with the commands from the third memory, determining the extent to which the commands are stored in the first memory, providing for the passage of commands from the second memory through the first memory to the third memory when a particular number of the commands is stored in the third memory, and determining the extent to which the commands are stored in the first memory, and providing for the continued passage of the commands from the second memory through the first memory to the third memory until there are less than a particular number of commands in the first memory.

36. In a method as set forth in claim 35, providing an estimate in the software of the total number of commands in the first, second and third memories, providing in the software for a determination of the total number of commands in the first, second and third memories when the total number of commands indicated in the software for the first, second and third memories reaches a particular value, substituting in the software the total number of the commands in the first, second and third memories in place of the estimate in the software of the number of commands in the first memory, and providing for the discontinuance of the introduction of the commands from the device driver software to the second memory when the number of commands in the first memory reaches a particular value.

37. In a method as set forth in claim 36 wherein the passage of commands from the second memory to the third memory continues until the third memory becomes full with commands and wherein the passage of commands thereafter continues from the second memory through the first memory to the third memory until the third memory becomes empty and wherein the passage of commands commences again from the second memory to the third memory when the first memory becomes empty.

38. In a method as set forth in claim 37, providing a ready indication having first and second states of operation, providing the ready indication in the first state during the time that the commands are passing from the device driver software to the second memory, providing for the ready indication in the second state when the first and third memories become full, providing for the passage of commands from the device driver software to other stages than the first memory when the ready indication is in the first state, providing for an interruption in the passage of the commands from the device driver software to the other stages when the ready indication is in the second state, and providing for a change in the ready indication from the second state to the first state when a command passes from the device driver software to the second memory.

39. In a combination for use with means constructed to provide commands and data, first memory means for receiving the commands from the providing means, second memory means for receiving the data from the providing means, third means responsive to the commands in the first memory means and the data in the second memory means for processing the data in accordance with such commands, and fourth means for introducing the commands from the providing means to the second memory means for introduction from the second memory means to the first memory means when the first memory means stores a particular number of the commands.

40. In a combination as set forth in claim 39 wherein the second memory means has a larger memory capacity than the first memory means and wherein the second memory means has a different rate of transferring commands than the first memory means.

41. In a combination as set forth in claim 39 wherein fifth means are provided for transferring the commands from the providing means to the first memory means, after the transfer of the commands from the providing means through the second memory means to the first memory means, when the second memory means has a particular number of commands in the second memory means.

42. In a combination as set forth in claim 39 wherein the providing means also introduces the commands to other stages than the first and second memory means and wherein fifth means are included for preventing the providing means from introducing the commands to the other stages when the first and second memory means are storing particular numbers of commands and wherein sixth means are included for providing for the introduction of the commands to the other stages, after the interruption of the transfer of the commands to the other stages in accordance with the operation of the fifth means, when the providing means introduces another one of the commands to an individual one of the first and second memory means.

43. In combination, means for transferring video and graphics information and commands, first memory means for storing graphics and video information and for storing commands providing for the transfer of the video and graphics information into and out of the first memory means, first means for transferring the video and graphics information into the first memory means from the transferring means, second memory means for storing the commands from the transferring means, second means operative in a first relationship for providing a transfer of the commands at first times from the transferring means to the second memory means and operative in a second relationship for providing for the transfer of the commands from the transferring means to the first memory means and then from the first memory means to the second memory means, third means for providing for the selective operation of the second means in the first and second relationships in accordance with the relative number of the commands in the first and second memory means, and fourth means for processing the graphics data from the first memory means in accordance with the commands from the second memory means.

44. In a combination as set forth in claim 43, the fourth means including fifth means for selectively transferring the graphics data from the first memory means at first particular times in accordance with the commands from the second memory means and for selectively transferring the video data from the first memory means at second particular times different from the first particular times in accordance with the commands from the second memory, and the fourth means being operative to selectively process the graphics information transferred from the second memory means at the first particular times.

45. In a combination as set forth in claim 43, the first memory means having characteristics for passing the commands to the second means at a first rate, and the second memory means having characteristics for passing the commands at a second rate different from the first rate, the third means being operative to provide for the operation of the second means in the second relationship when the second memory means is full with commands and to provide for the operation of the second means in the first relationship when the first memory is thereafter empty of commands.

46. In a combination as set forth in claim 43, the transferring means being operative to provide a transfer of commands to other stages than the first and second memory means, fifth means operative to prevent the transfer of the commands from the transferring to the other stages when the first and second memory means store particular numbers of commands, and sixth means for resuming the transfer of commands from the transferring means to the other stages when a command is subsequently transferred from the transferring means to an individual one of the first and second memory means.

47. In a method of processing information, including the steps of:

providing a first memory for storing commands, video data and graphics data in individual portions of the first memory, providing a second memory for storing commands, selectively transferring video data and graphics data into the individual portions of the first memory from software, selectively transferring commands at progressive instants of time from the software into an individual one of the first and second memories, and processing the graphics data in the individual portion of the first memory in accordance with the commands selectively transferred to the individual one of the first and second memories from the software.

48. In a method as set forth in claim 47, the steps of:

normally transferring the commands from the software to the second memory, providing for the transfer of the commands from the software to the first memory when the second memory has received and stored a particular number of the commands, and providing for the transfer of the commands from the first memory to the second memory.

49. In a method as set forth in claim 48, the step of:

providing for the continued transfer of the commands from the software to the first memory, after the initiation of such transfers, until the first memory has become emptied of commands to a particular value.

50. In a method as set forth in claim 49 wherein the commands are transferred from the first memory at a different rate then from the second memory and wherein the video data from the first memory is processed at first particular times and the graphics data from the first memory is processed at second particular times different from the first particular times and the graphics data from the first memory is processed in accordance with the commands selectively transferred from the individual ones of the first and second memories.

51. In combination, an integrated circuit chip, means for providing commands and data representing graphics and video, a first memory on the integrated circuit chip for receiving commands from the providing means, a second memory off the chip for storing commands, data representing graphics and data representing video in different portions of the second memory, first means disposed on the chip and having first and second operative relationships and operative in the first relationship for transferring commands from the providing means to the first memory and operative in the second relationship for passing commands from the providing means to the second memory, second means disposed on the chip and responsive to the numbers of commands in the first and second memories for providing for an operation of the first means in the first relationship at first particular times and for an operation of the first means in the second relationship at second particular times different from the first particular times, third means disposed on the chip and responsive to the transfer of the commands from the providing means to the second memory for transferring the commands from the second memory to the first memory, and fourth means responsive to the commands from the first memory and to the data representing the graphics for processing the data representing the graphics in accordance with such commands.

52. In a combination as set forth in claim 51, each of the first and second memories being constructed to pass the commands in the same order as received with a delay dependent upon the capacity of such memories and the second memory being operative at a different rate than the first memory.

53. In a combination as set forth in claim 52, the second means being operative to change the first means from the first operative relationship to the second operative relationship when the first memory stores a first particular number of commands and being operative to change the first means from the second operative relationship to the first operative relationship when the second memory stores a second particular number of commands.

54. In a combination as set forth in claim 53, the second memory having a greater storage capacity than the first memory, means on the chip for indicating the numbers of commands respectively in the first and second memories at each instant, and means for interrupting the transfer of the commands from the providing means to the individual ones of the first and second memories when the count in the first memory reaches the first particular number and the count in the second memory reaches an individual number different from the first and second particular numbers.

55. In a combination as set forth in claim 51, the second memory having a greater storage capacity than the first memory, and means on the chip for indicating the counts of the numbers of commands respectively in the first and second memories at each instant.

56. In combination, first means for providing commands and data, an integrated circuit chip, a first memory on the integrated circuit chip for receiving and storing the commands from the first means, a second memory off the integrated circuit chip for receiving and storing the commands from the providing means, second means disposed on the integrated circuit chip and having first and second operative relationships and operative in the first relationship to provide for a transfer of the commands from the first means to the first memory and operative in the second relationship to provide for a transfer of the commands from the first means to the second memory, third means disposed on the integrated circuit chip and responsive to the operation of the second means in the second relationship for providing for a transfer of the commands from the second memory to the first memory, fourth means disposed on the integrated circuit chip for providing for the operation of the second means in the first relationship at first times and in the second relationship at second times different from the first times, the first times being dependent upon the number of commands in the first memory and the second times being dependent upon the number of commands in the second memory, and fifth means disposed on the integrated circuit chip for receiving the data in the first memory and for processing such received data in accordance with the commands from the first means.

57. In a combination as set forth in claim 56 wherein the second memory is provided with a greater capacity than the first memory and wherein the first and second memories are provided with first and second ends constructed to receive the commands at the first end and to pass the commands through the memories to the second ends in the same order as received at the first ends and to transfer the commands from the memories at the second ends.

58. In a combination as set forth in claim 56 wherein sixth means are provided on the chip for preventing the transfer of commands from the providing means to the first and second memories when the memories become filled with commands and until a particular number of the commands in the second memory has been transferred from the second memory.

59. In a combination as set forth in claim 58 wherein the second memory is provided with a greater capacity than the first memory and wherein the first and second memories are provided with first and second ends and are constructed to receive the commands at the first end and to pass the commands through the memories in the same order as received at the first ends and to transfer the commands from the memories at the second ends and wherein seventh means is provided on the chip for operation in first and second relationships and wherein the seventh means is operative in the first relationship for preventing the transfer of commands from the providing means to other stages than the first and second memories and wherein eighth means is provided on the chip for operating the seventh means in the first relationship when the first and second memories become full with commands and for operating the seventh means in the second relationship when the second memory transfers at least a particular number of the commands in the second memory to the first memory.

60. In combination, means for providing commands and data, an integrated circuit chip, a first memory disposed on the integrated circuit chip and having a limited storage capacity for storing commands, a second memory disposed off the integrated circuit chip and providing an auxiliary storage capacity in a first portion of the second memory in addition to the limited storage capacity in the first memory, the second memory having a second portion for storing data transferred to the second memory, first means for primarily introducing the commands into the first memory and for secondarily introducing the commands into the second portion of the second memory when the first memory becomes full, second means for introducing to the first memory the commands transferred from the providing means to the first portion of the second memory, and third means for processing the data in the second portion of the second memory in accordance with the commands in the first memory.

61. In a combination as set forth in claim 60 wherein the auxiliary storage capacity in the first portion of the second memory is greater than the limited storage capacity of the first memory and wherein the commands are transferred from the first memory in the same order as received by the first memory and wherein the commands are transferred into the first portion of the second memory in the same order as received by the second memory.

62. In a combination as set forth in claim 60, fourth means for preventing a transfer of the commands from the providing means unit to stages other than the first and second memories when the first and second memories become full, and fifth means for providing for a transfer of the commands from the providing means to the other stages when a command thereafter passes from the providing means to an individual one of the first and second memories.

63. In a combination as set forth in claim 60, fourth means for by-passing the auxiliary storage capacity in the first portion of the second memory and for introducing the commands to the first memory when there are no commands in the first portion of the second memory after commands have been transferred from the providing means to the first portion of the second memory.

64. In combination, means for providing commands and graphics data, a first memory for receiving the commands from the providing means, a second memory for holding commands in a first portion of the second memory and graphics data in a second portion of the second memory, graphics user interface means for transferring commands to and from the first portion of the second memory and data to and from the second portion of the second memory, a local bus for transferring the commands and data to the first memory and to the graphics user interface means, and means for processing the graphics data in the second memory in accordance with the commands in the first memory.

65. In a combination as set forth in claim 64 for use with peripheral equipment operative in accordance with the commands from the providing means, peripheral bus control means for receiving the commands and the graphics data on the local bus for the introduction of the commands and the graphics data to the peripheral equipment to provide an operation of the peripheral equipment in accordance with such commands and graphics data.

66. In a combination as set forth in claim 64, means for transferring the commands in the first portion of the second memory to the first memory for the processing of the data in the second portion of the second memory in accordance with such commands.

67. In a combination as set forth in claim 66, control means for providing in a first operative relationship for the transfer of the commands from the providing means to the first memory and for providing in a second operative relationship for the transfer of the commands from the providing means to the first portion of the second memory, and means for normally providing for the operation of the control means in the first relationship and for providing for the operation of the control means in the second relationship when the memory means becomes full and for thereafter providing for the operation of the control means in the first relationship when the first portion of the second memory becomes empty.

68. In a combination as set forth in claim 64, an integrated circuit chip, the graphics user interface means, the first memory and the processing means being disposed on the integrated circuit chip, and a third memory disposed on the integrated circuit chip and having a particular storage capacity, means for providing for the transfer of the commands from the third memory to the first memory, the second memory being disposed off the chip, and means for normally providing for the transfer of the commands from the third memory to the first memory to obtain the processing of the graphics data in accordance with the commands in the first memory and for providing for the operation of the first portion of the second memory as an auxiliary storage capacity during the transfer of the commands from the third memory to the first memory.

69. In a combination as set forth in claim 64 wherein the first portion of the second memory has a greater storage capacity than the particular storage capacity of the third memory and wherein means are included for providing for the passage of the commands from the providing means through the local bus to the third memory and then from the third memory to the first memory for providing for the passage of the commands from the third memory to the first portion of the second memory and then to the third memory when the first memory is full with commands.

70. In a combination as set forth in claim 69 for use with peripheral equipment operative in accordance with commands and graphics data, peripheral bus control means for receiving the commands and the graphical data on the local bus for introduction of the commands and the graphics data to the peripheral equipment to provide an operation of the peripheral equipment in accordance with such commands and such graphics data.

71. In combination, means for providing commands and graphics data, a first memory for storing graphics data from the providing means unit, peripheral bus control means for receiving the commands from the providing means unit and the graphics data from the first memory, a local bus for introducing the commands from the providing means and the graphics data from the first memory to the peripheral bus control means, a second memory for holding commands in a first portion of the second memory and graphics data in a second portion of the second memory, graphics user interface means for transferring commands to and from the first portion of the second memory and graphics data to and from the second portion of the second memory, a peripheral bus for transferring the commands and data in the peripheral bus control means to the graphics user interface means, and means for processing the graphics data in the second portion of the second memory in accordance with the commands in the first memory and the first portion of the second memory.

72. In a combination as set forth in claim 71, an integrated circuit chip, the graphics user interface means being disposed on the integrated circuit chip, a third memory disposed on the integrated circuit chip, and the first memory having a particular capacity, and means for providing for the transfer of the commands from the third memory to the first memory to obtain the processing of the graphics data in accordance with the commands in the second memory and for providing for the first portion of the second memory to provide an auxiliary capacity in addition to the capacity in the first memory and the third memory.

73. In a combination as set forth in 72 wherein the first portion of the second memory has a greater capacity than the particular capacity of the first memory and wherein means are included for normally providing for the passage of the commands from the providing means through the local and peripheral buses to the third memory and for providing for the passage of the commands from the providing means through the local and peripheral buses to the third memory, then to the first portion of the second memory and then to the first memory when the particular storage capacity of the first memory is full with commands.

74. In a combination as set forth in claim 73 wherein means are included for reinstituting the passage of the commands from the providing means through the local and peripheral buses to the third memory and then to the first memory after the initiation of the passage of the commands from the providing means through the local and peripheral buses to the third memory and then to the first portion of the second memory and then to the first memory and after the first portion of the second memory is emptied of commands.

75. In a combination as set forth in claim 74 for use with peripheral equipments operative in accordance with commands on the peripheral bus, a ready line having first and second states of operation, means for preventing commands from passing on the peripheral bus to the peripheral equipment when the ready line is in the second state and for providing for the passage of the commands on the peripheral bus to the peripheral equipment when the ready line is in the first state, means for providing for the second state of operation in the ready line when the first portion of the second memory is full with commands, and means for providing for the second state of operation in the ready line when an additional command is introduced to the third memory and after the ready line has been operated in the second state.

76. In combination, means for providing commands and graphics data, a local bus for receiving the commands and the graphics data from the providing means, peripheral bus control means connected to the local bus for controlling the passage of the commands and the graphics data from the local bus, a peripheral bus connected to the peripheral bus control means for receiving commands, a shared memory connected to the peripheral bus and including a first portion for storing graphics data and a second portion for storing the commands from the providing means, the shared memory being connected to the peripheral bus for transferring the graphics data and the commands to and from the shared memory, graphics user interface means for transferring commands between the peripheral bus and the second portion of the shared memory and for transferring graphics data between the peripheral bus and the first portion of the shared memory, and means for processing the graphics data from the first portion of the shared memory in accordance with the commands from the second portion of the shared memory.

77. In a combination as set forth in claim 76, an additional bus connected to the graphics user interface means and the shared memory for transferring the graphics data and the commands between the graphics user interface means and the shared memory, the processing means being included in the graphics user interface means.

78. In a combination as set forth in claim 77, means included in the graphics user interface means for providing a second memory, means for providing for an introduction of the commands from the providing means to the second memory, and means for providing for the use of the second portion of the shared memory as an auxiliary memory for the second memory when the second memory becomes full.

79. In a combination as set forth in claim 78, an integrated circuit chip, the graphics user interface means and the second memory being disposed on the integrated circuit chip and the shared memory and the peripheral bus control means and the shared memory being disposed off the chip.

80. In a combination as set forth in claim 76, means included in the graphics user interface means for providing a second memory, control means having first and second operative relationships and operative in the first relationship to provide for the introduction of the commands from the providing means to the second memory for the processing of the graphics data in accordance with such commands from the second memory and operative in the second relationship to provide for the introduction of the commands from the providing means to the second portion of the shared memory and then to the second memory for the processing of the graphics data in accordance with the commands from the second memory, and means for providing for a controlled operation of the control means in individual ones of the first relationship and the second relationship.

81. In a combination as set forth in claim 80, means for providing for a change in the operation of the control means from the first relationship to the second relationship when the second memory becomes full, and means for providing for a change in the operation of the control means from the second relationship to the first relationship when the second portion of the shared memory becomes empty.

82. In a combination as set forth in claim 80, an additional bus connected to the graphics user interface means and the shared memory for transferring the graphics data and the commands between the graphics user interface means and the shared memory, and an integrated circuit chip, the graphics user interface means and the second memory being disposed on the integrated circuit chip and the shared memory and the peripheral bus control means being disposed off the chip.

83. In combination, means for providing commands and graphics data, a first bus for receiving the commands and the graphics data from the providing means, peripheral control means operatively coupled to the providing means for providing a controlled passage of the commands and the graphics data from the first bus, a peripheral bus connected to the peripheral bus control means for receiving the commands and graphics data from the peripheral control means, a shared memory connected to the peripheral bus and including a first portion for transferring commands between the peripheral bus and the first portion of the shared memory and including a second portion for transferring graphics data between the peripheral bus and the second portion of the shared memory, graphics user interface means connected to the peripheral bus for providing for a controlled transfer of the commands between the peripheral bus and the first portion of the shared memory and for providing for a controlled transfer of the graphics data between the peripheral bus and the second portion of the shared memory, and means connected to the peripheral bus for processing the graphics data transferred to the peripheral bus from the second portion of the shared memory means in accordance with the commands transferred to the peripheral bus from the first portion of the shared memory.

84. In a combination as set forth in claim 83, the graphics user interface means including a second memory, and means for introducing the commands from the providing means to the second memory for passage from the second memory for processing of the graphics data in the second portion of the shared memory in accordance with such commands.

85. In a combination as set forth in claim 84, means for providing for the passage of the commands to the first portion of the shared memory and then to the second memory when the second memory becomes full.

86. In a combination as set forth in claim 85, control means included in the graphics user interface means and having first and second states of operation and operative in the first state for providing for the passage of the commands to the second memory for the processing of the graphics data in accordance with the commands from the second memory and operative in the second state for providing for the passage of the commands to the second portion of the shared memory and then to the second memory for the processing of the graphics data in accordance with the commands from the second memory, and means for normally providing for the operation of the fast mentioned means in the first state and for providing for the operation of the last mentioned means in the second state when the second memory becomes full with commands.

87. In a combination as set forth in claim 86, the second portion of the shared memory having a larger capacity than the second memory, means for providing for a change in the operation of the control means from the second state to the first state when the second portion of the shared memory becomes empty, the graphics user interface means being connected to the peripheral bus, and an integrated circuit chip, the graphics user interface means, the second memory and the processing means being disposed on the integrated circuit chip and the shared memory and the peripheral bus control means being disposed off the chip.

88. In a combination as set forth in claim 83, the graphics user interface means being connected to the peripheral bus, and an integrated circuit chip, the graphics user interface means and the processing means being disposed on the chip, and the shared memory and the peripheral bus control means being disposed off the chip.

89. In a combination as set forth in claim 83, an integrated circuit chip, the graphics user interface means being disposed on the integrated circuit chip, a second memory disposed on the integrated circuit chip and having a particular storage capacity and operatively coupled to the graphics user interface means for receiving the commands from the peripheral bus, and means for providing for the transfer of the commands from the peripheral bus to the second memory to obtain the processing of the graphics data in accordance with such commands and for providing for the operation of the first portion of the shared memory as an auxiliary storage capacity in addition to the storage capacity of the second memory.

90. In combination, first means for providing commands, an integrated circuit chip, second means disposed off the chip for storing graphics data, third means disposed on the integrated circuit chip and having first and second ends and defining a shift register for providing a particular delay and for receiving the commands from the first means and for passing the commands through the third means and for passing the commands from the second end after the particular delay, fourth means disposed on the integrated circuit chip for processing the graphics data from the second means in accordance with the commands from the third means, the second means storing the graphics data in a first portion of the second means and also storing the video data in a second portion of the second means different from the first portion of the second means, and fifth means for providing for the processing of the graphics data at first particular times in accordance with the commands from the third means and for providing for the processing of the video data at second particular times different from the first particular times.

91. In a combination as set forth in claim 90, a host bus connected to the first means and the second means, a second bus connected to the second means and the third means for transferring commands and graphics data between the second means and the third means, peripheral bus control means connected to the host bus for providing controls in accordance with the commands on the host bus, and peripheral equipment connected to the peripheral bus control means for operation in accordance with the controls from the peripheral bus control means, the third means being included in the fourth means.

92. In a combination as set forth in claim 91, the graphics data being stored in a first portion of the second means, means for providing for the storage of the commands from the providing means in a second portion of the second means different from the first portion of the second means for use as an auxiliary capacity for the third means when the third means becomes full, means for eliminating the use of the second portion of the second means as additional capacity when the second portion of the second means becomes empty.

93. In combination, first means for providing commands, an integrated circuit chip, second means disposed off the chip for storing graphics data, third means disposed on the integrated circuit chip and having first and second ends and defining a shift register for providing a particular delay and for receiving the commands from the first means and for passing the commands through the third means and for passing the commands from the second end after the particular delay, fourth means disposed on the integrated circuit chip for processing the graphics data from the second means in accordance with the commands from the third means, a host bus connected to the first means and the second means, and a second bus connected to the second means and the third means for transferring commands and graphics data between the second means and the third means.

94. In combination, first means for providing commands, an integrated circuit chip, second means disposed off the chip for storing graphics data, third means disposed on the integrated circuit chip and having first and second ends and defining a shift register for providing a particular delay and for receiving the commands from the first means and for passing the commands through the third means and for passing the commands from the second end after the particular delay, fourth means disposed on the integrated circuit chip for processing the graphics data from the second means in accordance with the commands from the third means, the third means being included in the fourth means, a local bus connected to the providing means, peripheral bus control means for providing controls in accordance with the commands on the local bus, a host bus connected to the peripheral bus control means and the fourth means, and an additional bus connected to the fourth means and the second means for providing for the processing of the graphics data in accordance with the commands from the third means.

95. In a combination as set forth in claim 94, peripheral equipment connected to the peripheral bus control means for operation in accordance with the controls from the peripheral bus control means, the third means being included in the fourth means.

96. In a combination as set forth in claim 94, the graphics data being stored in a first portion of the second means, and means for providing for the storage of the commands from the providing means in a second portion of the second means different from the first portion of the second means for use as an auxiliary capacity for the third means when the third means becomes full.

97. In a combination as set forth in claim 96, means for eliminating the use of the second portion of the second means as additional capacity when the second portion of the second means becomes empty.

98. In combination, first means for providing commands, an integrated circuit chip, second means disposed off the chip for storing graphics data, third means disposed on the integrated circuit chip and having first and second ends and defining a shift register for providing a particular delay and for receiving the commands from the first means and for passing the commands through the third means and for passing the commands from the second end after the particular delay, fourth means disposed on the integrated circuit chip for processing the graphics data from the second means in accordance with the commands from the third means, the second means storing the graphics data in a first portion of the second means and also storing the video data in a second portion of the second means different from the first portion of the second means, and fifth means for providing for the processing of the graphics data at first particular times in accordance with the commands from the third means and for providing for the processing of the video data at second particular times different from the first particular times.

99. In combination, first means for providing commands, an integrated circuit chip, second means disposed off the chip for storing graphics data, third means disposed on the integrated circuit chip and having first and second ends and defining a shift register for providing a particular delay and for receiving the commands from the first means and for passing the commands through the third means and for passing the commands from the second end after the particular delay, fourth means disposed on the integrated circuit chip for processing the graphics data from the second means in accordance with the commands from the third means, peripheral bus control means for controlling the commands from the providing means, and a host bus connected to the peripheral bus control means, the second means, the third means and the fourth means for providing for the passage of the commands from the peripheral bus control means to the third means and for providing for the processing of the graphics data from the second means in accordance with the commands from the third means.

100. In a combination as set forth in claim 99, peripheral equipment connected to the host bus for operation in accordance with the commands from the peripheral bus control means, the third means being included in the fourth means.

101. In a combination as set forth in claim 99, the graphics data being stored in a first portion of the second means, and means for providing for the storage of the commands from the providing means in a second portion of the second means different from the first portion of the second means for use as an auxiliary capacity for the third means when the third means becomes full.

102. In a combination as set forth in claim 101, means for eliminating the use of the second portion of the second means as additional capacity when the second portion of the second means becomes empty.

103. In combination, first means for providing commands, an integrated circuit chip, second means disposed off the chip for storing graphics data, third means disposed on the integrated circuit chip and having first and second ends and defining a shift register for providing a particular delay and for receiving the commands from the first means and for passing the commands through the third means and for passing the commands from the second end after the particular delay, fourth means disposed on the integrated circuit chip for processing the graphics data from the second means in accordance with the commands from the third means, the graphics data being stored in a first portion of the second means, and means for providing for the storage of the commands from the providing means in a second portion of the second means different from the first portion of the second means for use as an auxiliary capacity for the third means when the third means becomes full.

104. In a combination as set forth in claim 103, means for eliminating the use of the second portion of the second means as an additional capacity when the second portion of the second means becomes empty of commands.

* * * * *